US007480502B2

(12) United States Patent

Biddulph

(10) Patent No.: US 7,480,502 B2

(45) Date of Patent: Jan. 20, 2009

(54) WIRELESS COMMUNICATIONS DEVICE WITH REFLECTIVE INTERFERENCE IMMUNITY

(75) Inventor: Stuart Biddulph, Provo, UT (US)

(73) Assignee: ClearOne Communications, Inc., Salt Lake City, UT (US)

( * ) Notice: Subject to any disclaimer, the term of this patent is extended or adjusted under 35 U.S.C. 154(b) by 474 days.

(21) Appl. No.: 11/274,032

(22) Filed: Nov. 15, 2005

(65) Prior Publication Data

US 2007/0111749 A1 May 17, 2007

(51) Int. Cl.
*H04M 3/42* (2006.01)

(52) U.S. Cl. .................... 455/416; 455/550; 455/575.1; 455/426; 455/556; 379/428; 379/433; 343/833

(58) Field of Classification Search ................ 455/416, 455/550, 575.1, 426, 556; 379/428, 433; 343/833, 834

See application file for complete search history.

(56) References Cited

U.S. PATENT DOCUMENTS 4,060,810 A 11/1977 Kerr et al.
4,167,010 A 9/1979 Kerr
4,378,468 A * 3/1983 Braun ......................... 381/93
4,555,592 A * 11/1985 Deinzer ...................... 455/416
4,669,108 A * 5/1987 Deinzer ...................... 455/416
4,712,231 A * 12/1987 Julstrom ................ 379/202.01
4,800,438 A * 1/1989 Yuter ......................... 348/836
4,816,835 A 3/1989 Abiko et al.
4,857,938 A 8/1989 Tsukamoto et al.
4,937,585 A 6/1990 Shoemaker
4,975,896 A * 12/1990 D'Agosto et al. ........ 369/29.01
5,185,611 A 2/1993 Bitter, Jr.
5,241,323 A 8/1993 Kelly
5,268,702 A 12/1993 Amano et al.
5,418,543 A 5/1995 Bolton
5,548,813 A 8/1996 Charas et al.
5,581,611 A * 12/1996 Yunoki .................. 379/211.03
5,600,331 A 2/1997 Buralli
5,708,971 A 1/1998 Dent
5,724,666 A 3/1998 Dent
5,754,145 A 5/1998 Evans
5,784,032 A 7/1998 Johnston et al.
5,832,389 A 11/1998 Dent
5,854,986 A 12/1998 Dorren et al.
5,917,456 A 6/1999 Teunisse
5,940,742 A 8/1999 Dent
5,986,616 A 11/1999 Edvardsson
6,002,359 A 12/1999 Chen (Continued)

*Primary Examiner*—Minh D Dao
(74) *Attorney, Agent, or Firm*—Everett D. Robinson; Echelon IP, LLC

(57) ABSTRACT

Disclosed herein are wireless products adapted to be positioned in a normal or resting position, that also include an antenna composed of a set of elements arranged in a plane in a radially symmetrical configuration providing a reduction in the susceptibility of reflected waves having the potential to cancel or weaken a main wave or signal, the plane positioned with respect to the normal position to direct a main communication line with a second wireless device into the plane and provide reception of a main and/or secondary signal at a plurality of phases. One exemplary product is a wireless conferencing device configured to rest on a tabletop, the antenna array oriented in a horizontal plane. Detailed information on various example embodiments of the inventions are provided in the Detailed Description below, and the inventions are defined by the appended claims.

18 Claims, 27 Drawing Sheets

U.S. PATENT DOCUMENTS

| | | | | |
|---|---|---|---|---|
| 6,006,103 | A * | 12/1999 | Van Lerberghe | 455/575.3 |
| 6,016,346 | A * | 1/2000 | Rittmueller et al. | 379/420.02 |
| 6,049,305 | A | 4/2000 | Tassoudji et al. | |
| 6,057,802 | A | 5/2000 | Nealy et al. | |
| 6,075,501 | A | 6/2000 | Kuramoto et al. | |
| 6,088,593 | A | 7/2000 | Dent | |
| 6,121,932 | A | 9/2000 | McCoy et al. | |
| H1877 | H | 10/2000 | Van Etten et al. | |
| 6,141,557 | A | 10/2000 | Dipiazza | |
| 6,151,310 | A | 11/2000 | Dent | |
| 6,157,340 | A | 12/2000 | Xu et al. | |
| 6,181,278 | B1 | 1/2001 | Kakimoto et al. | |
| 6,195,051 | B1 | 2/2001 | McCoy et al. | |
| 6,201,801 | B1 | 3/2001 | Dent | |
| 6,222,494 | B1 | 4/2001 | Erkocevic | |
| 6,281,844 | B1 | 8/2001 | Kodim et al. | |
| 6,285,324 | B1 | 9/2001 | Korisch et al. | |
| 6,292,152 | B1 | 9/2001 | Cosenza et al. | |
| 6,297,774 | B1 * | 10/2001 | Chung | 343/700 R |
| 6,342,860 | B1 | 1/2002 | Haussler et al. | |
| 6,359,589 | B1 | 3/2002 | Bae | |
| 6,369,770 | B1 | 4/2002 | Gothard et al. | |
| 6,377,227 | B1 | 4/2002 | Zhu et al. | |
| 6,421,029 | B1 | 7/2002 | Tanabe | |
| 6,424,304 | B1 | 7/2002 | Jan et al. | |
| 6,433,747 | B1 | 8/2002 | Cumro et al. | |
| 6,441,790 | B1 | 8/2002 | Forrester et al. | |
| 6,470,055 | B1 | 10/2002 | Feher | |
| 6,476,767 | B2 | 11/2002 | Aoyama et al. | |
| 6,480,162 | B2 | 11/2002 | Sabet et al. | |
| 6,483,463 | B2 | 11/2002 | Kadambi et al. | |
| 6,512,488 | B2 | 1/2003 | Schantz | |
| 6,518,929 | B1 | 2/2003 | Gilmore | |
| 6,518,937 | B2 | 2/2003 | Fang | |
| 6,531,985 | B1 | 3/2003 | Jones et al. | |
| 6,559,809 | B1 | 5/2003 | Mohammadian et al. | |
| 6,633,231 | B1 * | 10/2003 | Okamoto et al. | 340/539.11 |
| 6,639,560 | B1 | 10/2003 | Kadambi et al. | |
| 6,640,110 | B1 | 10/2003 | Shapira et al. | |
| 6,642,903 | B2 | 11/2003 | Schantz | |
| 6,661,381 | B2 | 12/2003 | Chen | |
| 6,664,932 | B2 | 12/2003 | Sabet et al. | |
| 6,665,348 | B1 | 12/2003 | Feher | |
| 6,697,019 | B1 | 2/2004 | Hyuk-Joon et al. | |
| 6,697,020 | B2 | 2/2004 | Ying | |
| 6,750,820 | B2 | 6/2004 | Killen et al. | |
| 6,765,539 | B1 | 7/2004 | Wang et al. | |
| 6,774,852 | B2 | 8/2004 | Chiang et al. | |
| 6,781,544 | B2 | 8/2004 | Saliga et al. | |
| 6,781,547 | B2 | 8/2004 | Lee | |
| 6,791,496 | B1 | 9/2004 | Killen et al. | |
| 6,801,170 | B2 | 10/2004 | Forrester et al. | |
| 6,806,840 | B2 | 10/2004 | Hung et al. | |
| 6,812,902 | B2 | 11/2004 | Rossman et al. | |
| 6,822,613 | B2 | 11/2004 | Kubota | |
| 6,836,246 | B1 | 12/2004 | Kadambi et al. | |
| 6,876,331 | B2 | 4/2005 | Chiang et al. | |
| 6,879,291 | B2 | 4/2005 | Duxbury et al. | |
| 6,888,504 | B2 | 5/2005 | Chiang et al. | |
| 6,933,986 | B2 | 8/2005 | Sward et al. | |
| 7,010,311 | B2 * | 3/2006 | Liu | 455/462 |
| 7,106,270 | B2 * | 9/2006 | Iigusa et al. | 343/833 |
| 7,146,180 | B1 * | 12/2006 | Liu | 455/465 |
| 7,254,123 | B2 * | 8/2007 | Jukarainen | 370/337 |
| 2001/0024959 | A1 | 9/2001 | Boyle et al. | |
| 2002/0024474 | A1 | 2/2002 | Chen | |
| 2002/0036593 | A1 | 3/2002 | Ying | |
| 2002/0057227 | A1 | 5/2002 | Fang | |
| 2002/0115435 | A1 * | 8/2002 | Soh | 455/426 |
| 2002/0140612 | A1 | 10/2002 | Kadambi et al. | |
| 2002/0164963 | A1 | 11/2002 | Tehrani et al. | |
| 2002/0173302 | A1 | 11/2002 | Baker et al. | |
| 2002/0175876 | A1 | 11/2002 | Schantz | |
| 2002/0175877 | A1 | 11/2002 | Schantz | |
| 2003/0030588 | A1 | 2/2003 | Kalis et al. | |
| 2003/0048834 | A1 | 3/2003 | Feher | |
| 2003/0063030 | A1 | 4/2003 | Stoiljkovic et al. | |
| 2003/0164800 | A1 | 9/2003 | Jordan et al. | |
| 2003/0176179 | A1 | 9/2003 | Hersey et al. | |
| 2003/0201943 | A1 | 10/2003 | Kadambi et al. | |
| 2003/0210193 | A1 | 11/2003 | Rossman et al. | |
| 2003/0210194 | A1 | 11/2003 | Gilmore | |
| 2003/0227414 | A1 | 12/2003 | Saliga et al. | |
| 2004/0036660 | A1 * | 2/2004 | Huor | 343/767 |
| 2004/0046694 | A1 | 3/2004 | Chiang et al. | |
| 2004/0077379 | A1 | 4/2004 | Smith et al. | |
| 2004/0100404 | A1 | 5/2004 | Hung et al. | |
| 2004/0104856 | A1 | 6/2004 | Stoijkovic et al. | |
| 2004/0110469 | A1 | 6/2004 | Judd et al. | |
| 2004/0116164 | A1 * | 6/2004 | Beguet et al. | 455/575.1 |
| 2004/0119643 | A1 | 6/2004 | Lee | |
| 2004/0150570 | A1 | 8/2004 | Yuasa et al. | |
| 2004/0174303 | A1 | 9/2004 | Duxbury et al. | |
| 2004/0196813 | A1 | 10/2004 | Ofek et al. | |
| 2004/0196923 | A1 | 10/2004 | Feher | |
| 2004/0266481 | A1 | 12/2004 | Patel et al. | |
| 2005/0003865 | A1 | 1/2005 | Lastinger et al. | |
| 2005/0080849 | A1 * | 4/2005 | Wee et al. | 709/204 |
| 2005/0110641 | A1 | 5/2005 | Mendolia et al. | |
| 2005/0110674 | A1 | 5/2005 | Mendolia et al. | |
| 2005/0113138 | A1 | 5/2005 | Mendolia et al. | |
| 2005/0206573 | A1 * | 9/2005 | Ligusa et al. | 343/770 |
| 2005/0286443 | A1 * | 12/2005 | McMillen et al. | 370/260 |

* cited by examiner

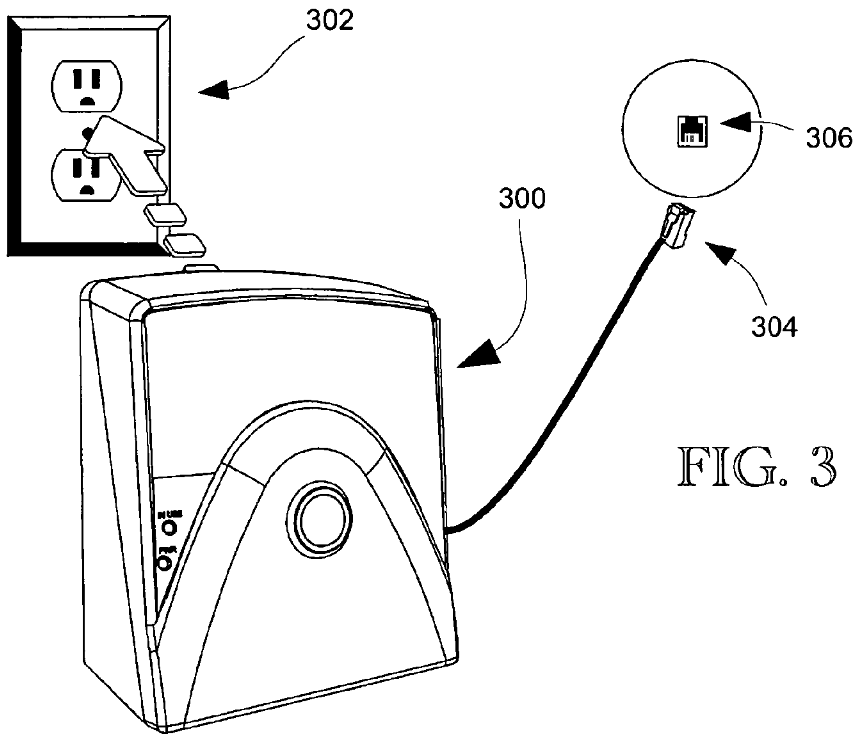
FIG. 3
FIG. 4
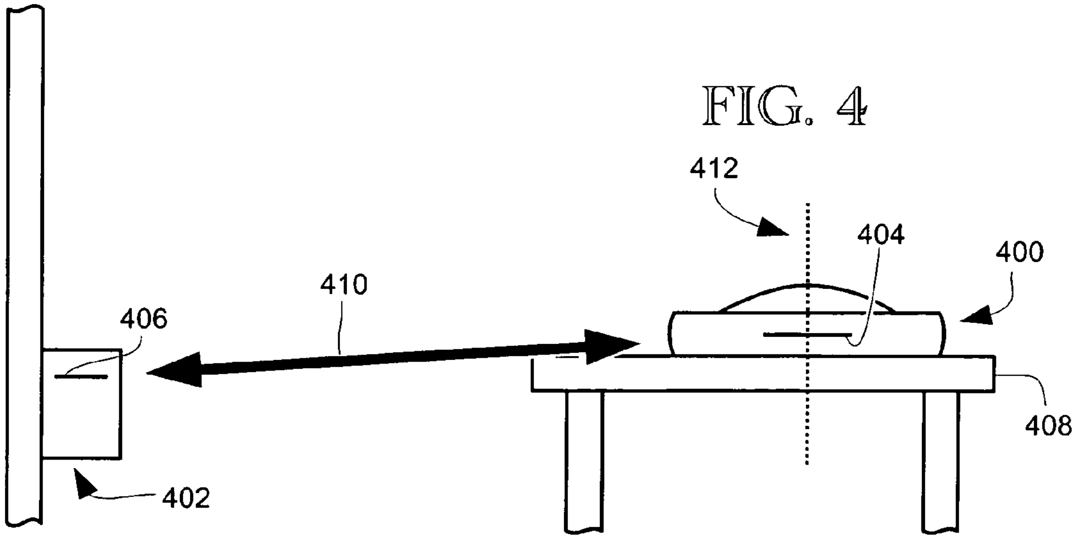

FIG. 5
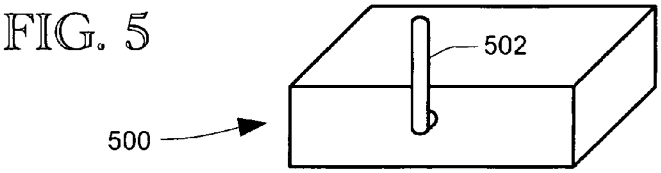
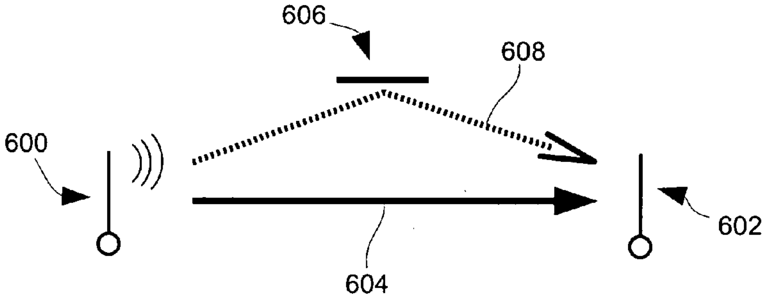
FIG. 6A
FIG. 6B
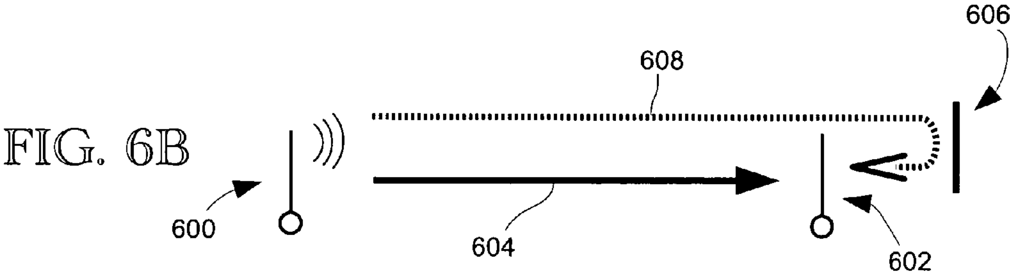
FIG. 6C
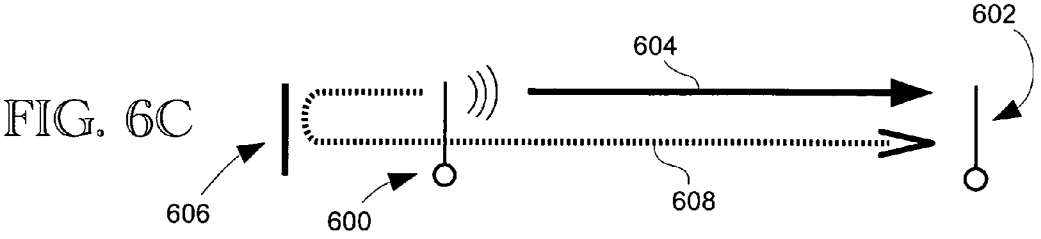
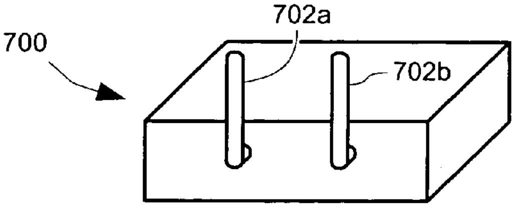
FIG. 7

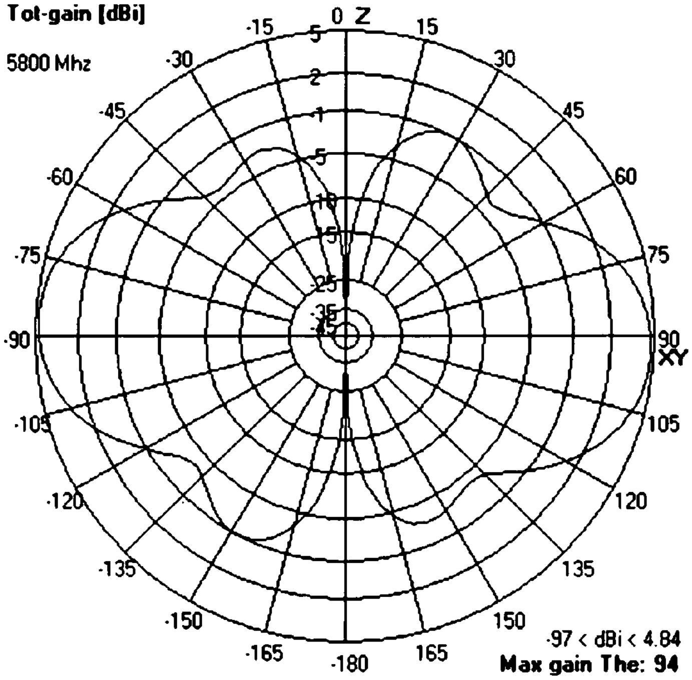
FIG. 9B
FIG. 10
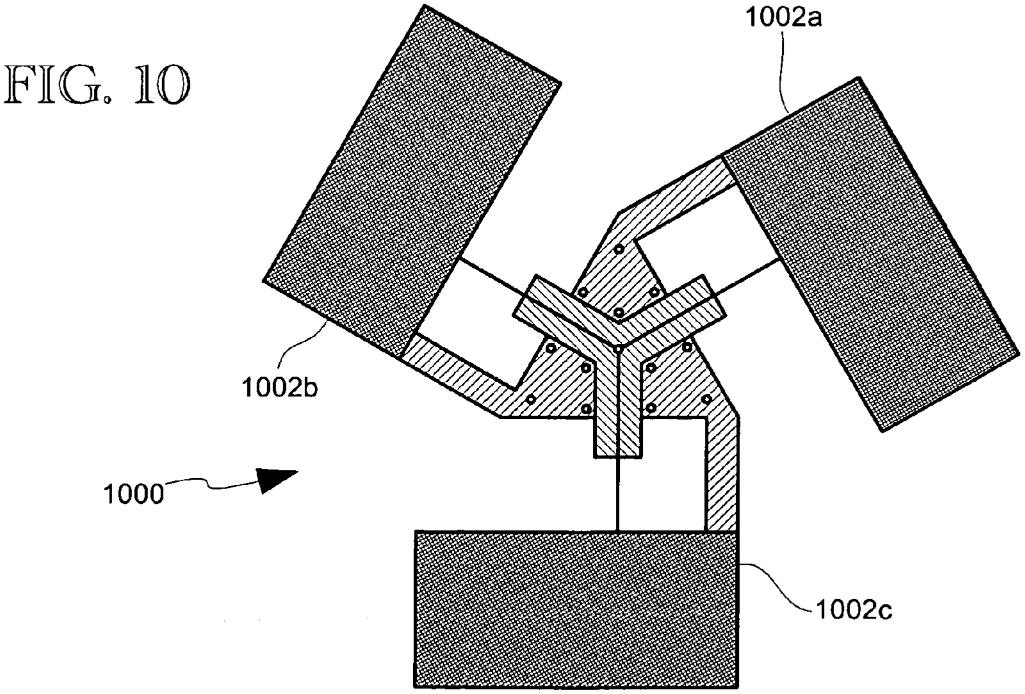

FIG. 11
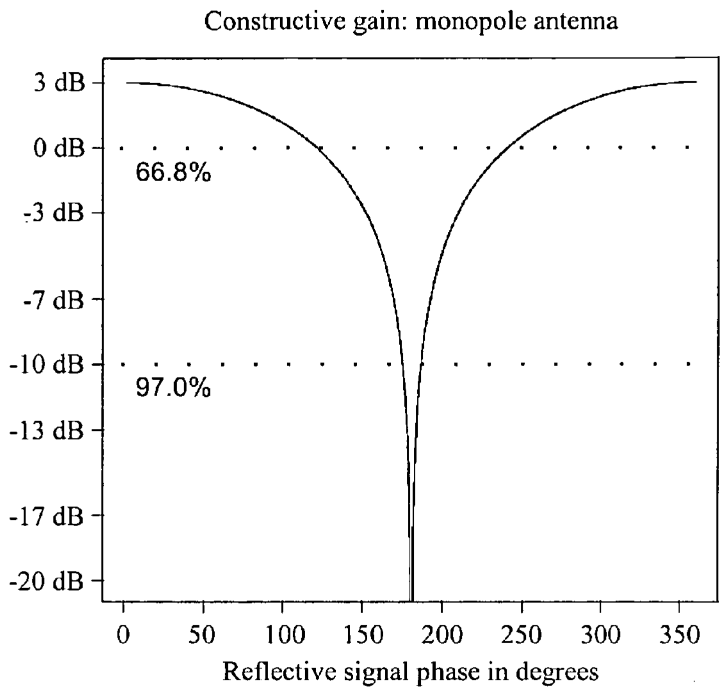
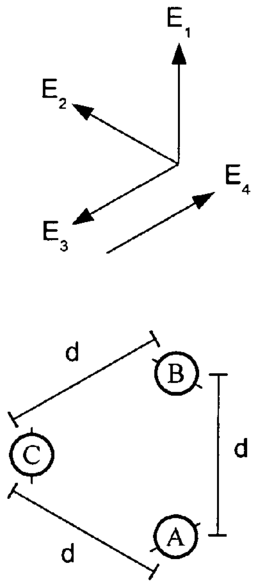
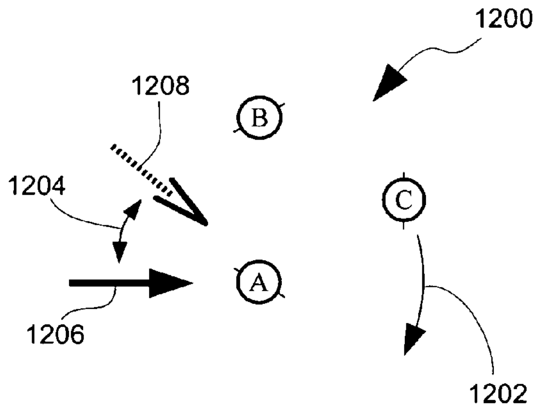
FIG. 12B
FIG. 12A

Constructive gain of tri-strip element antenna
Reflecting signal oriented at 30 degrees to primary signal Constructive gain of tri-strip element antenna
Reflecting signal oriented at 30 degrees to primary signal Electric field gain, Z axis

WIRELESS COMMUNICATIONS DEVICE WITH REFLECTIVE INTERFERENCE IMMUNITY

BACKGROUND

The claimed systems and methods relate generally to electronic devices incorporating an antenna that includes several commonly-fed radiating elements, and more particularly to antenna arrays that include a set of radiating or receiving elements arranged in a radially symmetrical configuration within a plane and fed by a balanced transmission network and products that include such arrays.

BRIEF SUMMARY

Disclosed herein are wireless products adapted to be positioned in a normal or resting position, that also include an antenna composed of a set of elements arranged in a plane in a radially symmetrical configuration providing a reduction in the susceptibility of reflected waves having the potential to cancel or weaken a main wave or signal, the plane positioned with respect to the normal position to direct a main communication line with a second wireless device into the plane and provide reception of a main and/or secondary signal at a plurality of phases. One exemplary product is a wireless conferencing device configured to rest on a tabletop, the antenna array oriented in a horizontal plane. Detailed information on various example embodiments of the inventions are provided in the Detailed Description below, and the inventions are defined by the appended claims.

BRIEF DESCRIPTION OF THE DRAWINGS

FIG. 3 depicts a second exemplary wireless device configured as a base station providing connection to a telephone network and a wireless communication channel with the device of FIG. 1.

FIG. 4 illustrates a spatial relationship between a first and second wireless device and an antenna defining a vertical axis and horizontal plane.

FIG. 5 depicts elements of an ordinary wireless product.

FIG. 6A depicts a reflective interference pattern between a first and second wireless device.

FIG. 6B depicts another reflective interference pattern between a first and second wireless device where the reflector is located near a receiving device.

FIG. 6C depicts a reflective interference pattern between a first and second wireless device where the reflector is located near the transmitting device.

FIG. 7 depicts an exemplary wireless device including two antennas and diversity made through antenna switching.

FIG. 9B shows a gain pattern in a plane perpendicular to the plane of an antenna array similar to that shown in FIGS. 8A-C.

FIG. 10 depicts a second exemplary antenna array utilizing patch radiating/receiving elements.

FIG. 11 shows the constructive gain pattern of a theoretical monopole antenna in the presence of a secondary signal of varying phase.

FIG. 12A depicts a theoretical antenna element relationship in connection with a number of incident waves.

FIG. 12B shows the definition of several variables used in a simulation of an antenna as depicted in FIG. 12A.

Reference will now be made in detail to anti-reflective interference antenna arrays which may include various aspects, examples of which are illustrated in the accompanying drawings.

DETAILED DESCRIPTION

Described herein are examples of tabletop electronic devices that include a planar-oriented antenna. The discussion below will reference an exemplary device depicted generally in FIGS. 1 and 2 and referred to in connection with FIGS. 3 and 4. It will become apparent that the antennas described herein may be incorporated to other tabletop electronic devices, which devices are included in the scope of the discussion below.

Figure 1:
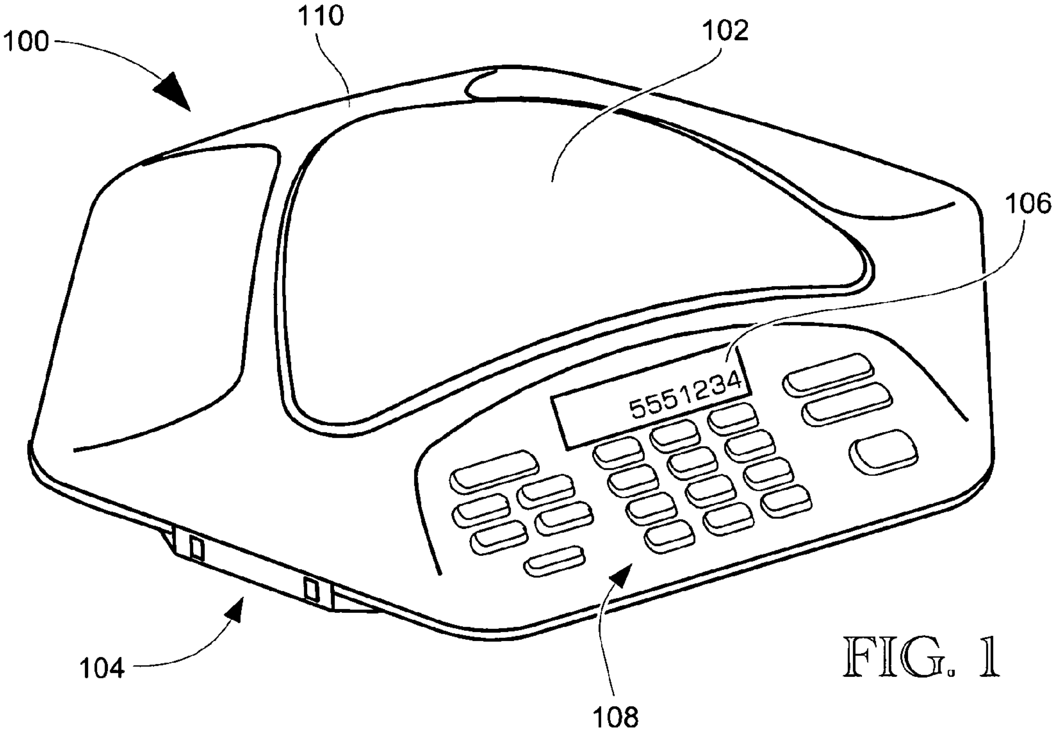
FIG. 1 depicts an exemplary wireless tabletop electronic conferencing device.

Referring first to FIG. 1, the exemplary wireless tabletop electronic device is shown in FIG. 1, which device is a wireless conferencing system pod. Exemplary device 100 includes a housing 110 having a substantially flat bottom, not shown, whereon the device may rest on a table or other flat surface. Device 100 includes a speaker 102 and optionally a speaker grill, located substantially in the center of the top of the device whereby produced audio may be projected into a room with wide dispersion. Three bi-polar microphones are positioned at 120 degree intervals in the horizontal resting plane of device 100 substantially around the speaker, providing substantially 360 degree coverage in that plane. Device 100 further includes a display 106, which provides visual indicators of the operational status of the device. A keypad 108 is also included providing command input to device 100, and may provide digit keys, an on/off hook key, setup keys, volume and mute keys, and other keys as desired.

The exemplary product 100 is wireless, meaning that a radio-based communication channel with a second electronic device can be established through an included radio antenna and transmitter, receiver or transceiver electronics. A second electronic device might be a base station, as depicted in FIG. 3, or another wireless product according to the desired operation of the particular product.

Figure 2:
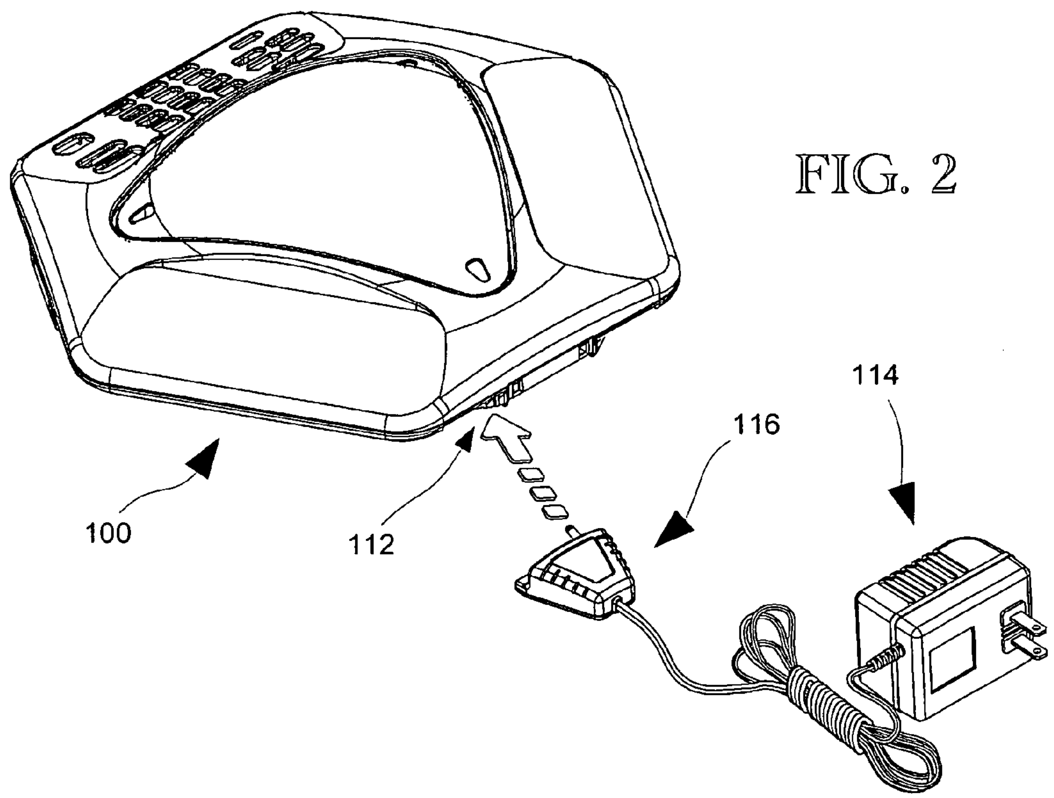
FIG. 2 shows the connection of an external power supply to the exemplary device of FIG. 1.

Referring now to FIG. 2, the exemplary product 100 may be powered from an external power source, in this example a wall AC-DC adapter 114 connectable through a connector 116 and socket 112. Optionally, the exemplary product 100 might include rechargeable batteries and an internal charging circuit. Alternatively, the exemplary product 100 might include a battery compartment adapted to contain and connect rechargeable or non-rechargeable battery types.

In any case, the exemplary product 100 is designed to be carried from place to place, providing for spontaneous locating of the device on any number of tables or settings within any number of rooms within the range of the wireless link. The conference participant may be thereby freed from the requirement of holding conferences at particular locations where conference equipment is fixably installed. It may be that a conference participant would benefit from holding a conference at his desk, or in an ordinary room or conference room in which an electronic conferencing system is not installed. Additionally, a conference participant may relocate a conference with a remote party to another room or area within wireless range without breaking the connection to the remote party. A further benefit might be achieved for organizations that have several conference rooms, in that a single teleconferencing system may be shared between the rooms with little or no modification to building structure.

The exemplary conferencing device 100 is part of a conferencing system that includes a base station 300 as depicted in FIG. 3. This base station 300 is designed for connection to a common telephone network, and includes a plug 304 suitable for connection to the telephone network jack 306. In this example, station 300 further includes prongs, not shown, for connection to mains power through a wall jack 302. Station 300 further includes an antenna and a transceiver designed for radio communication with device 100.

Referring now to FIG. 4, a spatial environment and relationship of an exemplary horizontally rotatable electronic wireless device 400 to a second wireless device 402 is depicted. In this exemplary device 400 the housing is configured to rest on a tabletop 408 and is rotatable about a repositionable vertical axis 412. Axis 412 is repositionable, in this example, by moving device 400 to different locations on tabletop 408, or by relocating device 400 elsewhere while maintaining axis 412 in a substantially vertical orientation. Device 400 includes an antenna configured with good gain substantially in the horizontal plane with respect to vertical axis 412, and electronics suitable to communicate with second wireless device 402. Second device 402 includes an antenna 406 for wireless communication with first device 400. In this figure, device 402 is a wall mount device, such as the base station 300 shown in FIG. 3. It is to be understood, however, that either device 400 or 402 might be mounted on a tabletop, pedestal, hung, suspended or provided any other mounting, provided that device 402 is located substantially in the plane of antenna 404. If that plane is horizontal, as shown, that plane may be referred to as the horizontal plane. While communicating, first device 400 and second device 402 send and/or receive information through a radio carrier established mainly in the direction 410 between antennas 404 and 406.

Portable wireless communication systems have taken a number of forms, of which certain are presently and commonly known to consumers including cellular telephones, cordless telephones, 802.11x ("Wi-fi") computer network equipment and portable transceivers such as those used by public servants or private individuals on various assigned channels. Much of that portable equipment utilizes a configuration as shown in FIG. 5. That configuration includes a housing 500, which may be fashioned of metal, plastic or other material, from which protrudes a "stub" antenna 502 designed to resonate at or near the frequency of use. At high frequencies, antenna 502 may be fashioned from a length of wire or other conductive length, which length is often oriented vertically to place the maximal gain of the antenna in the horizontal direction. At lower frequencies, the resonant length of antenna 502 may become cumbersome, and various techniques are used to compress the antenna, such as forming into a coil or adapting or accepting an impedance mismatch at the transmitter.

Recently with the expanding use of frequencies above 1 GHz, certain wireless communication products, such as cellular telephones, have incorporated microstrip and patch antennas, which are implemented as regions of copper foil on the printed circuit boards incorporated to the products. For those products, the enclosure is made of a radio-transmissive material such as plastic so as not to attenuate the radio signals passing through the enclosure to the internal antenna. The antennas of those products often include only a single element. For devices that may be located in a variety of orientations, such as cellular telephones, antennas with non-directional gains may be preferable.

One problem that may be encountered in the operation of wireless products is destructive interference due to the reception of secondary signals arriving at canceling phases to a main signal. Referring first to FIG. 6A, a first wireless device 600 transmits a signal to second wireless device 602 by way of a main path or primary wave 604. Now it is to be understood that although a signal is shown passing in one direction for the sake of simplifying this discussion, a signal could be sent in the reverse direction taking advantage of the symmetries of radio propagation. Therefore for the antennas and wireless devices described herein, driven and receiving elements as well as transmitters and receivers may be interchanged while not disturbing the inherent antenna interference or interference immunity properties described herein.

In the example of FIG. 6A, the antennas of devices 600 and 602 are substantially omni-directional, and therefore the signal is transmitted and received in many alternate directions other than path 604. A secondary signal traveling over reflective path 608, originating from one alternate direction, is reflected off of an object 606 and received at second device 602. Object 606 might be any number of objects which reflect radio signals, such as doors, filing cabinets or metal wall studs. Reflections may be exacerbated by the use of high frequencies and short wavelengths as smaller objects become better reflectors, as opposed to diffractors, of the radio waves. If the reflected signal 608 arrives substantially out of phase with the main signal 604, the receiving device 602 may receive an attenuated signal. Such a condition may be acceptable if the devices 600 and 602 are used in close proximity. However a user may notice dead spots near the periphery of the operational range of the devices, which may result in communication errors or drop-outs in those locations.

At present, the usual suggested solution for this problem is to relocate one or both of the devices, which may effect in either an attenuation or a change in phase of the reflected signal. For example, many users of cordless phones have found that particular locations in their homes are prone to static noise, and naturally relocate to a better location. Additionally, many manufacturers include a suggestion to reorient or relocate antennas in the event of interference.

The reflected-destructive interference problem has two particular problematic configurations, depicted in FIGS. 6B and 6C. In the configuration shown in FIG. 6B, the reflecting object 606 is positioned behind and nearby the second device 602. Consider the case where reflecting object 606 is perfect reflector or mirror in the frequency of interest. If antenna element 602 is one-quarter wavelength from reflector 606 there will be perfect cancellation less the attenuation of the reflected wave 608 over one-half wavelength of travel. That interference can be avoided to some degree by relocating either the second device 602 or the object 606 by up to about one-half wavelength either toward or away from the first device 600. The configuration shown in FIG. 6C is perhaps the most difficult to mitigate, as relocation of second device 602 will not result in a change in the phase relationship between the main signal 604 and the reflected signal 606. In that circumstance the second device must be located some distance away to avoid the dead spot produced by that configuration.

Attempts have been made to mitigate the reflected-destructive interference problem. Referring now to FIG. 7, wireless device 700 includes two antennas 702_a_ and 702_b_ placed at some distance from each other. Wireless device 700 further includes a switch, not shown, which connects a transmitter, receiver or transceiver to one of antennas 702_a_ or 702_b_. Further incorporated to device 700 is a controller and signal sensing electronics for measuring the strength of signals received at antennas 702_a_ and 702_b_ and selecting the position of the switch in accordance to a programmed algorithm run by the controller. In transmitting, either antenna is generally used, in order to avoid the complexity involved in the receiver telling the transmitter which transmit antenna gives the best signal strength at the receiver. An alternative to this approach, also involving yet higher complexity, is once a two-way link is established, to switch the transmitter to the antenna that receives the remote signal with the most strength. This approach depends on radio symmetry to suggest the right antenna for transmitting. Clusters of antennas may also be used in this fashion, as is done for cellular telephone towers. Additionally, combinations of antennas are also sometimes used to boost the signal beyond that available for any one particular antenna. The ability to communicate with radio devices through an increased number of positions in spite of interference is called diversity.

A wireless device implementing this switching diversity is necessarily a more complex and expensive product, with the addition of a switch that operates at the communication channel frequency, a signal-strength sensor and the incorporation of more than one antenna. Additionally, a switching algorithm may be difficult to develop and test due to the inability of the designer to observe the operation of the device without additional hooks or hardware into a test product. There is therefore a cost penalty for implementing a switching diversity solution to avoid reflected-destructive interference. Described below are improved antennas that achieve some immunity to reflective interference without the use of switches, sensors or control algorithms.

In an alternative scheme, an antenna may be fashioned with more than one radiating element. These elements may be positioned to take advantage of the phase differences between the elements with respect to the main and reflected signals, thereby increasing the usable number of positions and/or orientations in the presence of reflected secondary signals.

Figure 8A:
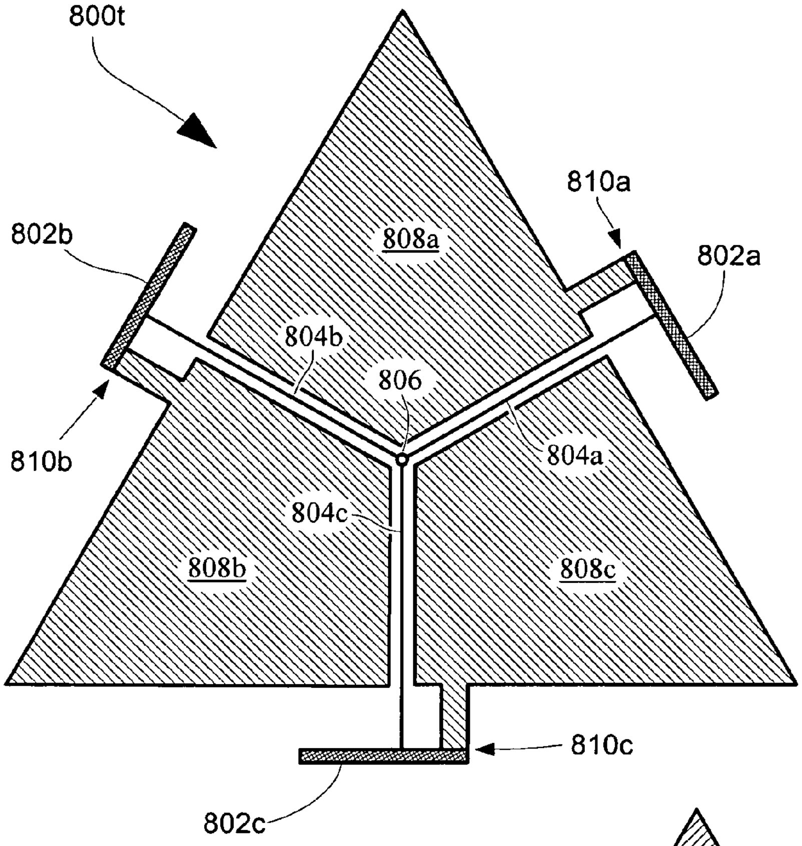
FIG. 8A depicts a top or first layer of an exemplary anti-reflective interference antenna array.
Figure 8B:
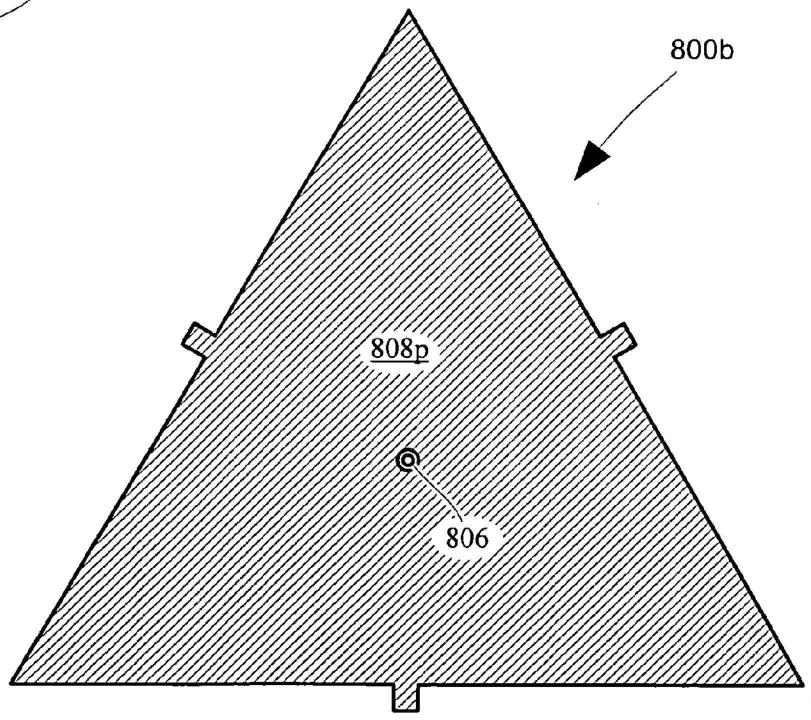
FIG. 8B depicts a bottom or ground layer of the antenna of FIG. 8A.
Figure 8C:
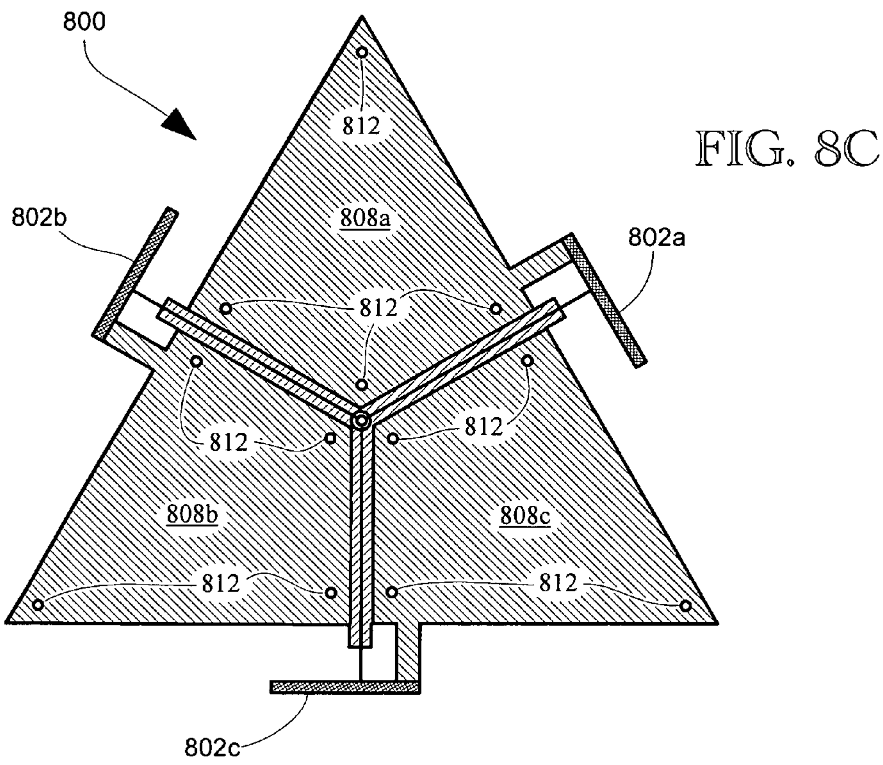
FIG. 8C shows the relationship of the top and bottom layers of the antenna of FIGS. 8A and 8B.

Antennas incorporating several elements may be fashioned using printed circuit board techniques, wherein the elements may be designed as microstrip antennas. FIGS. 8A, 8B and 8C (hereinafter FIG. 8) depict one such antenna. Shown in FIG. 8A is the top layer 800*t* of that antenna, including three radiating/receiving microstrip elements 802*a*, 802*b* and 802*c*. In this example, each element is oriented substantially perpendicular to a line passing through the element and the center of the element set. Those elements are connected to a central combiner 806 through feed transmission lines 804*a*, 804*b* and 804*c*, in this example all of equal length. In this example, those elements are positioned at the points of an equilateral triangle, which provides for a more even gain pattern. A ground plane is formed by regions 808*a*, 808*b* and 808*c*, connecting through vias to the bottom ground plane underneath. A ground plane is not strictly necessary, but may be used if desired to control the impedance of the transmission lines and array, or to control the gain pattern of the array. The radiating elements are connected to the top grounds 808*a-c* at their ends and excited by transmission lines 804*a-c*. The ground tabs, shown in FIG. 8B as extensions from the bottom ground plane, are positioned under the transmission lines for impedance matching purposes. A coupling between regions 808*a-c* and ground may be a direct connection, as shown, or may be a capacitive coupling.

Depicted in FIG. 8B is a second or bottom layer 800*b*, which includes a ground plane 808 and through which central combiner 806 passes through, which combiner may be implemented as a plated via or through hole in the incorporating circuit board. Shown in FIG. 8C is a printed circuit board assembly of layers 800*t* and 800*b* overlaid, with vias 812 forming a matrix connection of grounds 808*a-c* and 808*p*. The distance between transmission lines 804*a-c* and ground regions 808*a-c*, the configuration of couplings 810*a-c*, the feed point on the micro-strip or patch elements and the thickness and type of lamination between layers 800*t* and 800*b* generally determine the impedance of the antenna element array as seen by the transmitter, and may be selected accordingly. In one example, the characteristic impedance of the transmission line legs 804*a-b* is designed to be 150 ohms, thereby producing an impedance of 50 ohms at combiner 806. The ground regions 808*a-c* and plane 808*p* may also be varied in accordance with a desired gain pattern and/or immunity to proximal noise sources. In this example an equilateral triangle, formed by imaginary lines connecting to the center of each of the three antenna elements 802*a-c*, has a height of one-half wavelength at the frequency of design. This exemplary configuration results in the centers of the patches being oriented tangent to a circle of 0.333 wavelength radius from the center of that triangle. The completed antenna layers including elements, transmission lines, combiner and optional ground planes may be positioned horizontally within respect to a housing in a resting position, for example as shown in FIG. 4 for device 400 and antenna 404.

If desired, antenna element array such as 800 may be fashioned utilizing ordinary printed circuit board laminates, if the antenna is to be connected to a receiver only or if small impedance imbalances between the transmission feed lines 804*a-c* are not excessive to the transmitter design. If impedance balance or control is deemed to be important, particularly at high frequencies, a higher quality laminate including impregnated fiberglass and/or low water absorption may be used, such as those available from Rogers Corporation of Chandler, Ariz. Additionally, an antenna element array such as 800 may be fashioned in a circuit board with additional layers, for example having circuit layers for transmitter components or lands for a feed-line connector with ground plane 808*p* placed between layer 800*t* and the additional layers.

The structure of antenna element array 800 is as follows. First, elements 802*a-c* are positioned at the corners of an equilateral triangle. In the example of FIGS. 8A-C, elements 802*a-c* are microstrip antennas, and are oriented in 120 degree rotations. Combiner 806 is positioned at the center of elements 802*a-c*, by which transmission lines 804*a-c* are kept equal length, thereby maintaining a symmetry of the antenna gain pattern, impedance balance and propagation delays. Now although symmetry in the gain pattern is not required, it may provide a uniformity in antenna performance so as to remove a need to orient the device to a second wireless device.

The scale of an antenna element array may be varied, although a reduction that places the antenna elements closer than about ¼ to ⅛ wavelength produces degeneration of the antenna immunity characteristics to those of a monopole, or single element antenna. The upper limit to scale may depend largely on the physical size of the wireless device into which an antenna array will be placed. However, the distance between elements has an effect on the reflective interference immunity properties, as will be discussed below. Now although the discussion below speaks of antenna arrays of three elements, arrays of four, five or even more elements may be fashioned using the principles described herein. Indeed, the designs and discussion below for antenna arrays of three elements may be adapted for any arrangement of antenna elements arranged in a radially symmetrical configuration.

In a first scale, the distance between elements is ½ wavelength, as measured from the approximate centers of the radiating structures or elements. Referring now to FIG. 12A, the points labeled A, B and C represent the theoretical antenna elements shown in FIG. 8A, equally separated by a distance 'd' of ½ wavelength. Now it is understood that real antenna elements have physical size, and further that currents may not necessarily pass through exactly the center of an element. Nevertheless, the separation distance may be varied to a small degree while maintaining the characteristics of theoretical antenna designs discussed and simulated below. In one useful approximation, this separation distance may be measured between the joints where an antenna element mates with a transmission feed line.

Still referring to FIG. 12A, $E_1$, $E_2$ and $E_3$ are the maximal E field vectors of traveling electromagnetic waves impinging on the antenna elements. If the antenna elements are combined from their centers at an equidistant point, and if the antenna elements are identically shaped and rotated apart by 120 degrees, the contribution of the antenna elements may be expressed as follows:

$$E_{combined}=E_A+E_B+E_C$$

$$E_A=E_1(\text{Cos }0°)(\text{Cos }60°)+E_2(\text{Cos }90°)(\text{Cos }60°)+E_3(\text{Cos }90°)(\text{Cos }0°)$$

$$E_B=E_1(\text{Cos }180°)(\text{Cos }60°)+E_2(\text{Cos }0°)(\text{Cos }0°)+E_3(\text{Cos }0°)(\text{Cos }60°)$$

$$E_C=E_1(\text{Cos }90°)(\text{Cos }0°)+E_2(\text{Cos }90°)(\text{Cos }60°)+E_3(\text{Cos }90°)(\text{Cos }60°)$$

In the equations above, the first cosine term of each factor represents the incident electromagnetic wave phase, while the second cosine term represents the incident wave angle of arrival with respect to the antenna element. A solution of these equation shows that the array is substantially omni-directional.

Referring again to FIG. 12A, consider $E_4$ which is 180 degrees out of phase with $E_2$ arriving at point C at the same time such that they cancel each other out. At point B $E_2$ and $E_4$ also cancel, but element A is positioned at a point of constructive interference, and sensing the combined array effectively reconstructs the signal. Thus in this particular antenna design, the position of an antenna element at a distance other than ½ wavelength with respect to the interfering wave permits reception of the original signal.

Figure 9A:
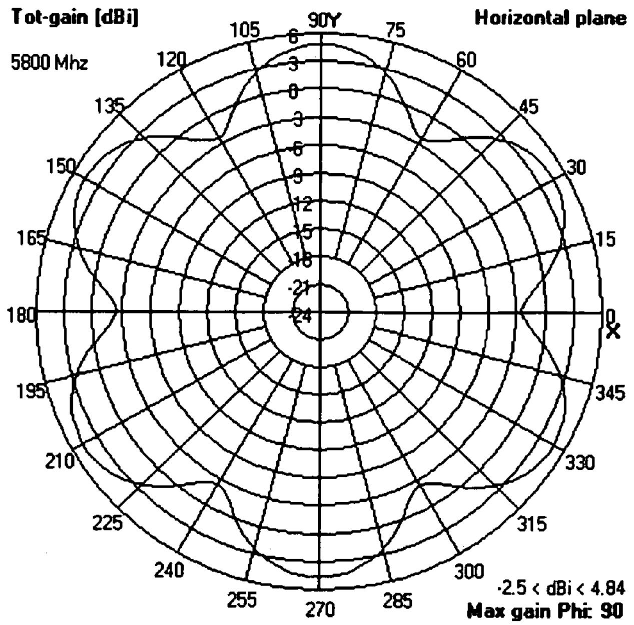
FIG. 9A shows a gain pattern in the plane of an antenna array similar to that shown in FIGS. 8A-C.

Referring again to the antenna design shown in FIG. 8, with a separation of ½ wavelength, the horizontal gain of an antenna in free space of that type is depicted in FIG. 9A, where the horizontal plane is the plane of the antenna mounted horizontally as shown in FIG. 4. Although the gain deviates by about 7.5 dB, the antenna can be used as an omni-directional antenna. The corresponding vertical gain of the theoretical microstrip antenna is appears in FIG. 9B, which shows that the antenna is mainly horizontally polarized. An antenna composed of patch elements or substantial monopoles may be less horizontally polarized.

Shown in FIG. 10 is a tri-element antenna array 1000 similar to that shown in FIG. 8, with patches 1002*a*, 1002*b* and 1002*c* replacing the microstrip antennas 802*a-c*. The use of patches as antenna elements may serve to enhance the omnidirectivity of each element, and thereby reduce the effect of the second cosine term from the equations above. Elements of both microstrip and patch/monopole designs will be evaluated below.

Now referring to FIG. 11, the constructive gain of a monopole antenna is shown with respect to a main and a secondary wave from an originating source. For the remainder of this discussion, a theoretical monopole antenna of one omnidirectional element is considered, although the behavior of a single directional element would be much the same. The omnidirectivity is with respect to the horizontal plane only. Therefore this theoretical monopole antenna might be physically implementable as a half-wave dipole antenna oriented in the vertical direction. To further simplify the analysis, the secondary wave will be considered to be exactly the same strength as the main wave, although in practice a secondary wave would likely be the weaker signal.

First, for the monopole, in the best case the constructive gain is 3 dB in phase relationships near 0 degrees between the main and secondary waves, as the received amplitude is essentially two times the main wave. However only 66.8 percent of the possible phases of the secondary wave are constructive to the primary wave. Thus where a reflected signal exists, about one-third of the time it will have a destructive effect. Even where a −10 dB allowance is made in the wireless system, 97.0 percent of the possible phases are acceptable, while 3.0 percent supply a potential null to wireless operation.

In an open environment, without reflecting objects, a user of a wireless product incorporating such a monopole antenna may relocate that product at will within the limit of communication range, and not experience dropouts or a degradation of signal. Considering an environment with reflecting objects, a loss of signal might be experienced for up to one-third of the positions within that communication range. In a telecommunications device, this could result in a dropout and disconnection if a device were moved through a destructively interfering position, or provide areas of unusability, especially where separations between wireless devices are to approch the maximum. As dropouts and degradation of audio signal impact a user's experience in a direct and negative way, the elimination of even a portion of these areas of dropout or degradation can result in a more positive view of a wireless product and a perception of quality and reliability.

In one alternative, such a monopole antenna product could overcome these interference problems to some extent by transmitting at a higher power. This is not an optimal solution, first because transmitting at a higher power causes potential interference to other devices operating on or near the same frequency. Additionally, there are often regulatory limits to the power levels that can be used, and this option may be unavailable. Furthermore, for portable wireless devices, transmission at higher powers uses more current from battery sources, which determines either a shorter operation life between battery charges or the use of larger batteries.

To show the characteristics of the multi-element antenna arrays disclosed herein, a program was written to provide performance simulation and visual display, which appears below in Appendix I. The language used is called "R", and an interpreter environment with instructions for use can be obtained on the Internet at http://www.r-project.org. Now whereas the monopole antenna "simulation" has only one variable, the phase of the secondary wave to the main wave, a two-dimensional multi-element array simulation considers three variables: (1) the rotation of the antenna in the plane of the array, (2) the phase of secondary wave with respect to the primary wave and (3) the angle of the secondary wave with respect to the primary wave, or alternatively the antenna.

Referring now to FIG. 12B, those three variables are defined with respect to the simulation program. First, the rotation of the array 1200 is shown at the 0 degrees position. Increasing rotational array position proceeds in the direction 1202 about the element marked "A." Primary wave 1206 strikes the element marked "A" in a reference phase, with incident phases on elements "B" and "C" computed from the array rotational position. The phase of secondary wave is considered to be 0 degrees if the phases of waves 1206 and 1208 are identical as received at element "A." Secondary wave 1208 is rotatively positioned from the fixed direction of primary wave 1206 in the angle 1204. As this array has three elements and is symmetrical, the gain pattern is subdivided into three identical patterns, and therefore the gains computed for rotations 1204 of 0 to 120 degrees are identical to those of 120 to 240 and 240 to 360 degrees. Further, it can be observed that the gain pattern from 60 to 120 degrees is a mirror-image of the pattern from 0-60 degrees, and therefore the simulation need only consider that range of angle 1204.

Figure 13A:
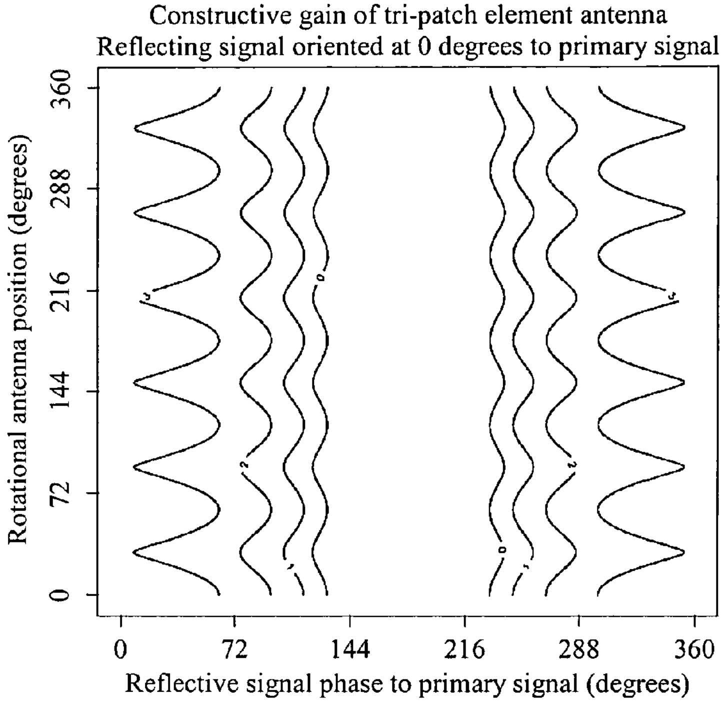
FIG. 13A shows a contour representation of a simulated constructive gain pattern of a theoretical tri-patch element antenna array having a separation of ½ wavelength with a secondary wave oriented at a 0 degree angle to a primary wave.

A simulation was conducted for a monopole-element array (i.e. with non-directional elements) with ½ wavelength spacing between elements, for which the constructive gain patterns appear in the following order: secondary wave arriving at same angle (0 degrees) as primary wave, FIGS. 13A and 13B; with secondary wave arriving at a 15 degree angle 1204, FIGS. 13C and 13D; 30 degrees, FIGS. 13E and 13F; 45 degrees, FIGS. 13G and 13H; and 60 degrees, FIGS. 13I and 13J. Each gain pattern is represented by a contour plot and a corresponding image plot. The gain presented is a comparison to a single monopole element, which represents either the voltage or power gain. For the contour plots, the lines are labeled in a logarithmic scale, with 0 gain equal to the gain received by a single monopole element. For the image plots, the lighter gray represents greater gain, while dark gray or black represents poor gain or destructive interference. Areas of white indicate constructive gains less than −10 dB, which for the purposes of this discussion will be considered to be a null.

Figure 13B:
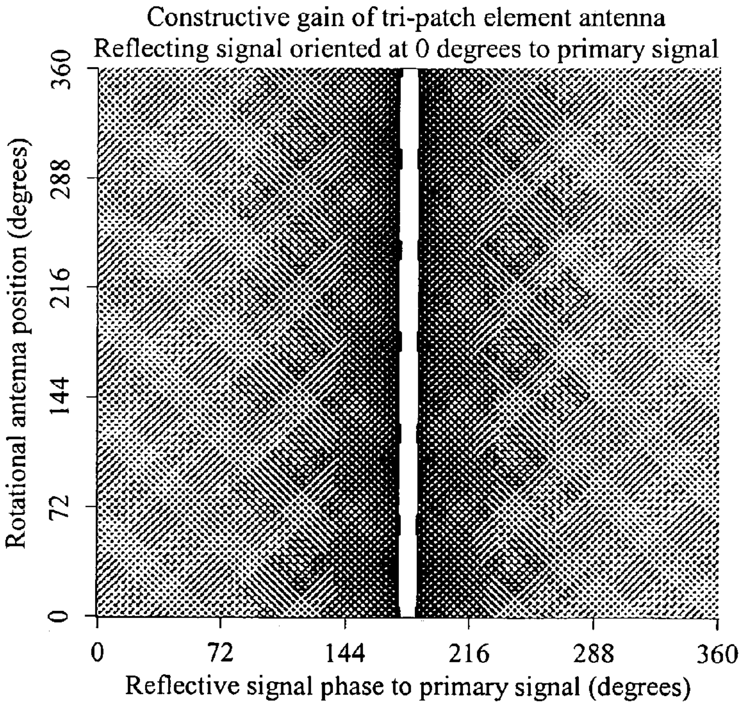
FIG. 13B shows a grayscale representation of a simulated constructive gain pattern of FIG. 13A.

Referring first to FIG. 13B, an area of destructive interference (or null) can be observed near 180 degree phase, regardless of rotational antenna position. This type of null is a general feature of all antenna types, which may be caused by a configuration as depicted in FIG. 6C. Even so, the width of this 'straight' null can vary by antenna design.

Figure 13C:
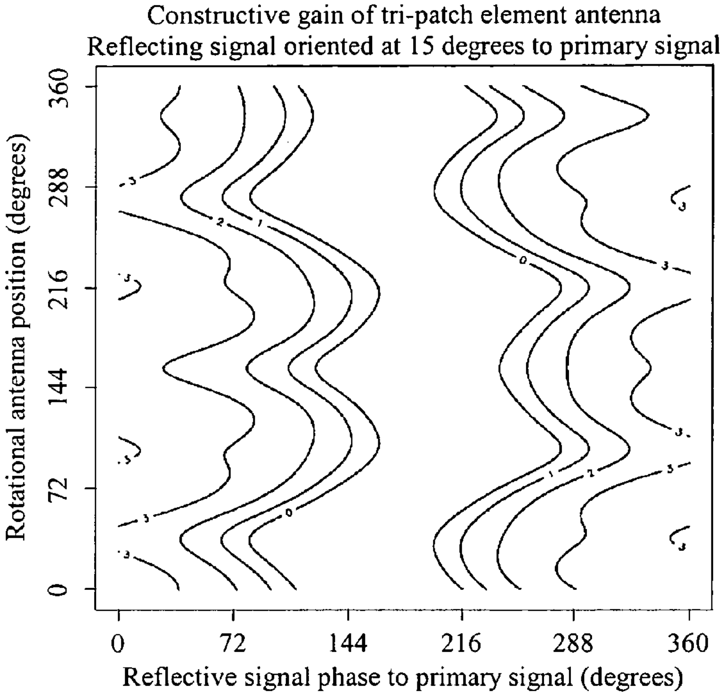
FIG. 13C shows a contour representation of a simulated constructive gain pattern of that array with a secondary wave oriented at a 15 degree angle.
Figure 13D:
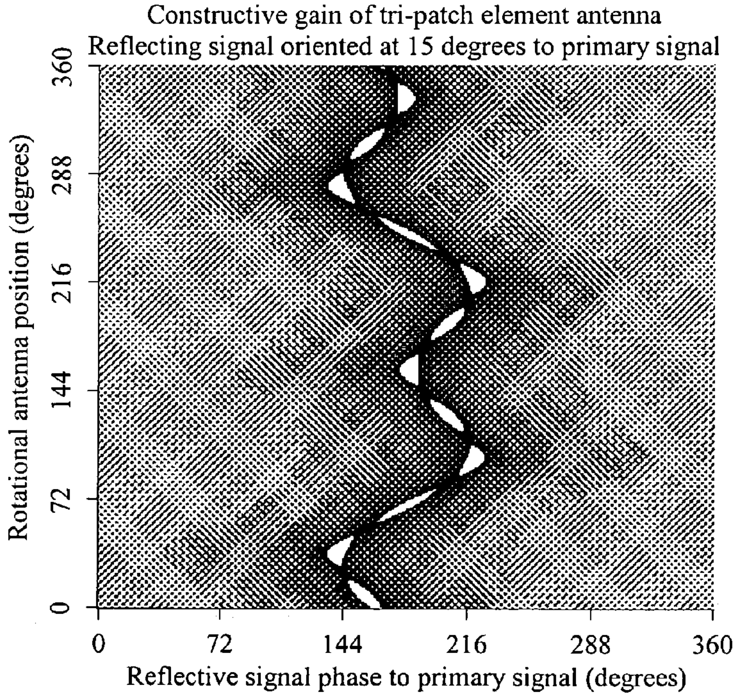
FIG. 13D shows a grayscale representation of a simulated constructive gain pattern of FIG. 13C.

Referring next to FIGS. 13C and 13D, as the reflected or secondary wave rotates with respect to the primary wave, rotation of the antenna has the effect of phase shifting the null a number of degrees in the secondary wave phase. Thus the model design has the property that for separation angles between the primary and a secondary wave other than multiples of 60 degrees, rotation of the antenna or the incorporating device in the horizontal plane can shift the null out of a destructive phase without spatially relocating the antenna or device. Also at 15 degrees, the areas of null are reduced; indeed there are some antenna rotational positions that do not exhibit a null.

Figure 13E:
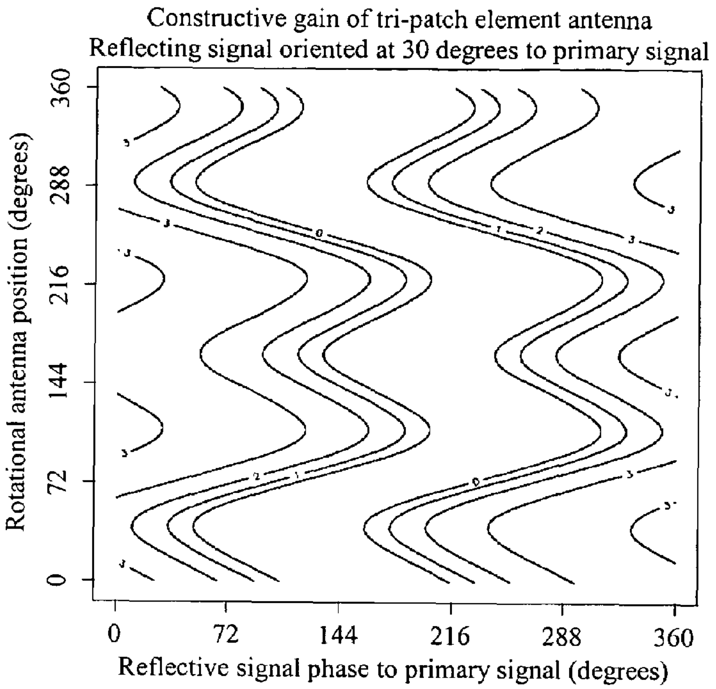
FIG. 13E shows a contour representation of a simulated constructive gain pattern of that array with a secondary wave oriented at a 30 degree angle.
Figure 13F:
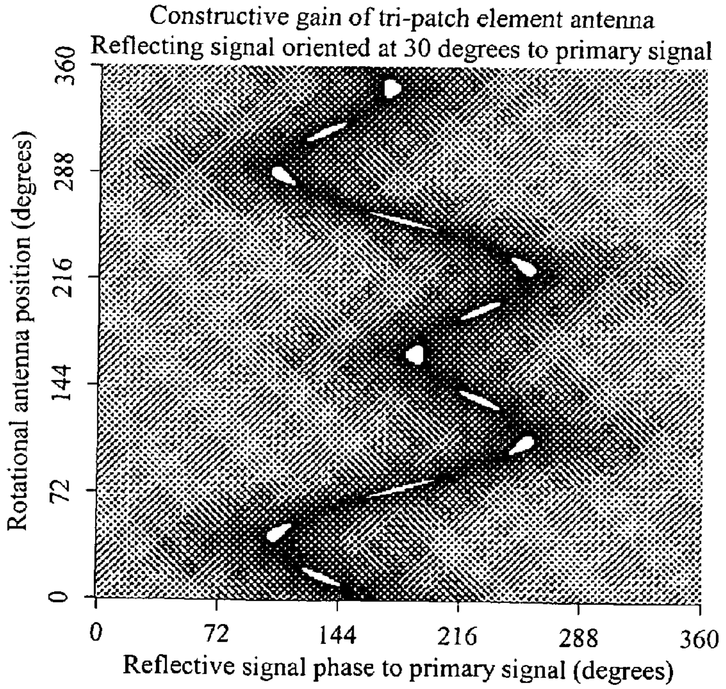
FIG. 13F shows a grayscale representation of a simulated constructive gain pattern of FIG. 13E.
Figure 13G:
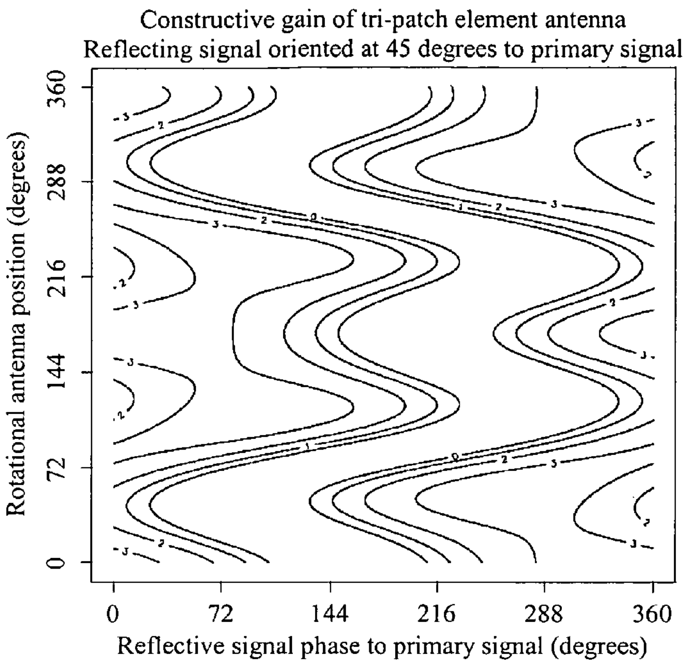
FIG. 13G shows a contour representation of a simulated constructive gain pattern of that array with a secondary wave oriented at a 45 degree angle.
Figure 13H:
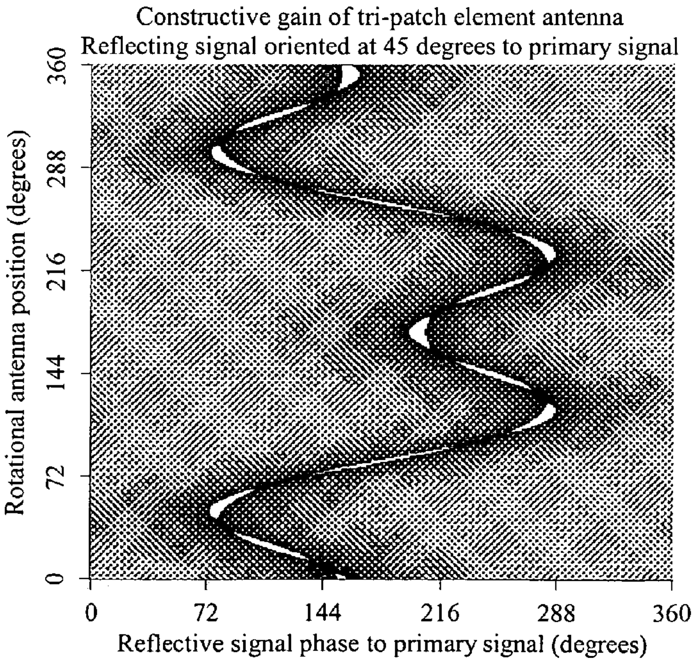
FIG. 13H shows a grayscale representation of a simulated constructive gain pattern of FIG. 13G.
Figure 13I:
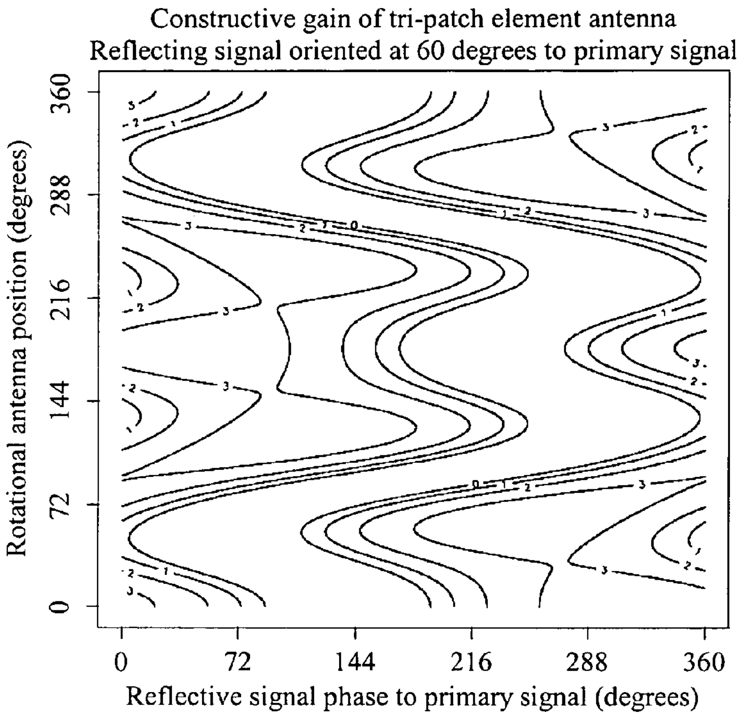
FIG. 13I shows a contour representation of a simulated constructive gain pattern of that array with a secondary wave oriented at a 60 degree angle.
Figure 13J:
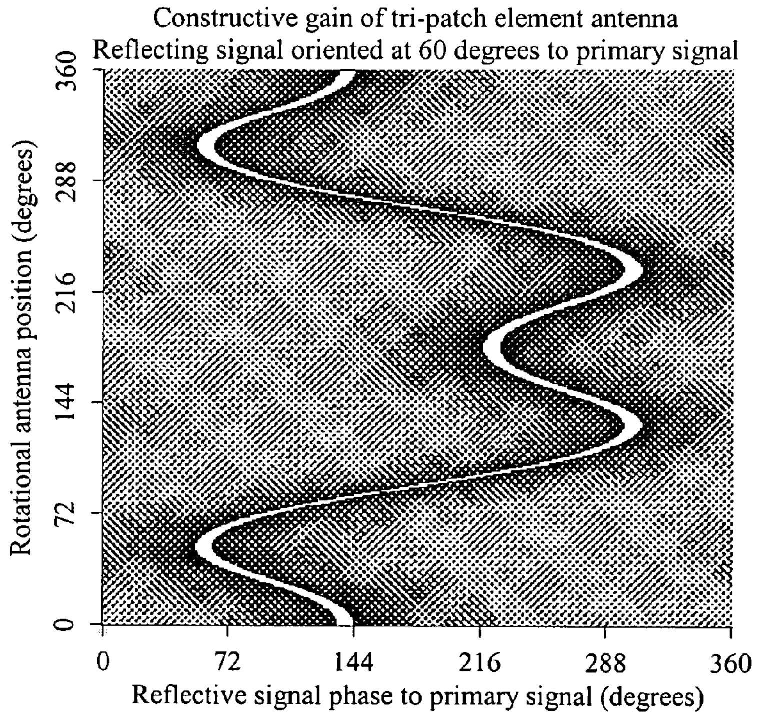
FIG. 13J shows a grayscale representation of a simulated constructive gain pattern of FIG 13I.

Continuing to 30 degrees and FIGS. 13E and 13F, it can be seen that the nulls continue to reduce, and the rotational advantage for this antenna improves. Referring now to FIGS. 13G and 13H, as the secondary wave rotation continues past 30 degrees to 45 degrees, the curve of the null widens, and the areas of null increase. Finally, referring to FIGS. 13I and 13J, at a 60 degree angle between the primary and secondary signal, a continuous null appears similar to that of 0 degrees, but distorted and highly dependent on the rotational antenna position.

Figure 14A:
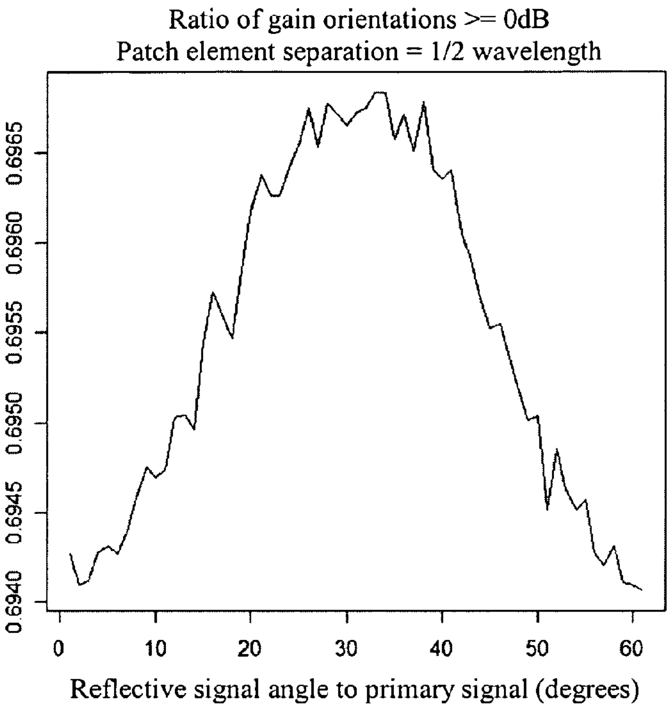
FIG. 14A shows the ratio of constructive to available positions/orientations of a simulated tri-patch element antenna array having a element separation of ½ wavelength over angles between a primary and a secondary wave.
Figure 14B:
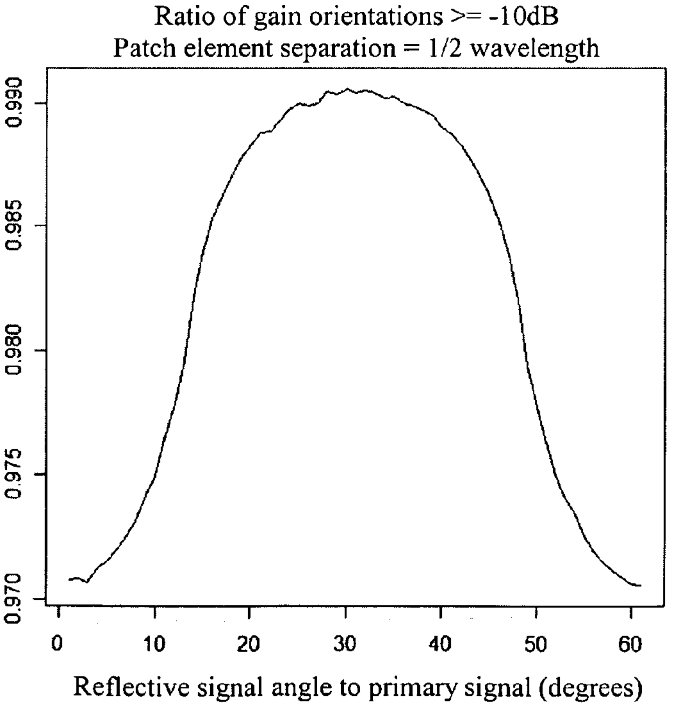
FIG. 14B shows the gain ratio of FIG. 14A with a –10 dB allowance.

Now although the ability to rotate out of a null may be important in some applications, it might be more interesting to consider the probabilities of encountering a null by random user placement of a wireless device and/or antenna. This may be done by considering the ratio of usable or unusable device positions to the total available device positions with respect to the three variables noted above. Referring now to FIG. 14A, the probability curve of encountering constructive interference (gain above 0 dB) is displayed referencing again the angle between the primary and secondary waves. Recalling from FIG. 11, this antenna produces a modest improvement of almost three percent over the monopole. Looking now to FIG. 14B, the probability of having a gain not less than −10 dB is displayed (the 'anti-null' characteristic.) Near 0 and 60 degrees, the probability is similar to that of the monopole antenna at 97.0 percent. However as the angle approaches 30 degrees, a noticeable improvement can be seen to about 99 percent. Overall, this design theoretically reduces the −10 dB nulls from about three to two percent over all angles.

Figure 15A:
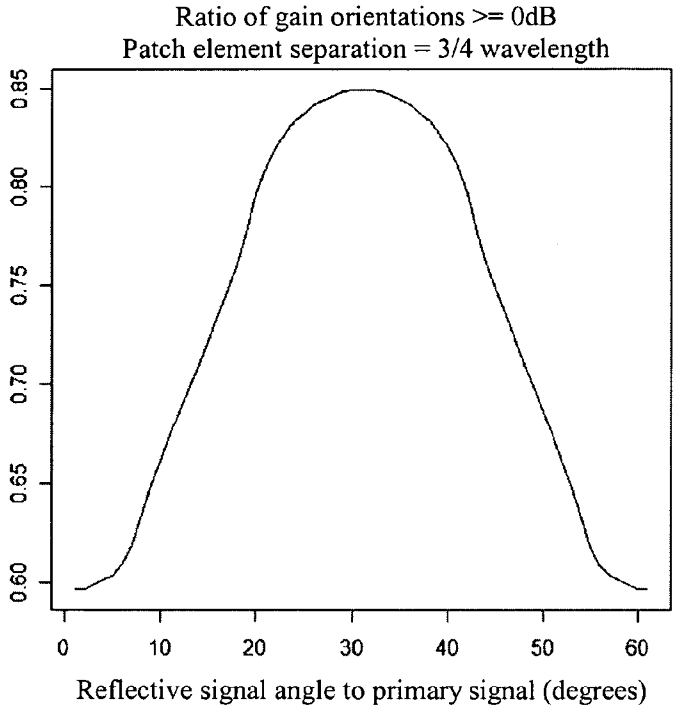
FIG. 15A shows the gain ratio of FIG. 14A, using a separation of ¾ wavelength.
Figure 15B:
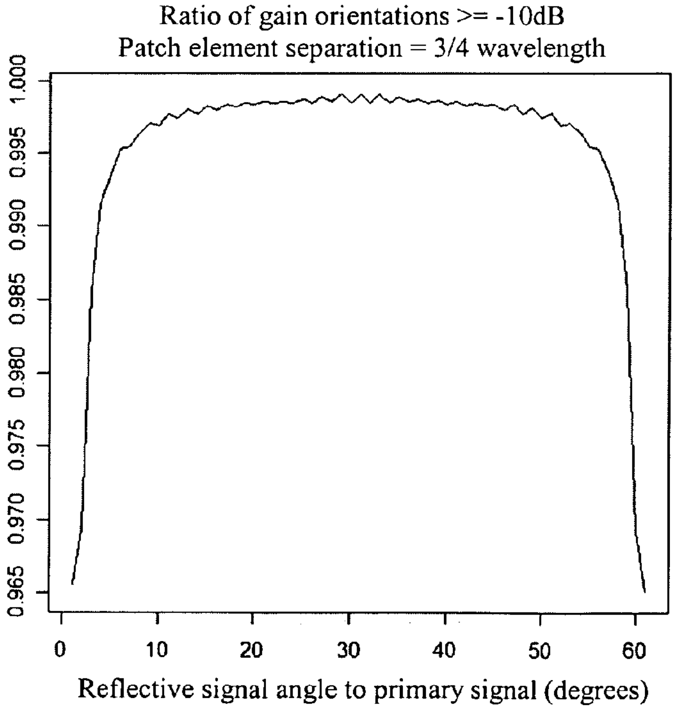
FIG. 15B shows the gain ratio of FIG. 15A with a –10 dB allowance.
Figure 16A:
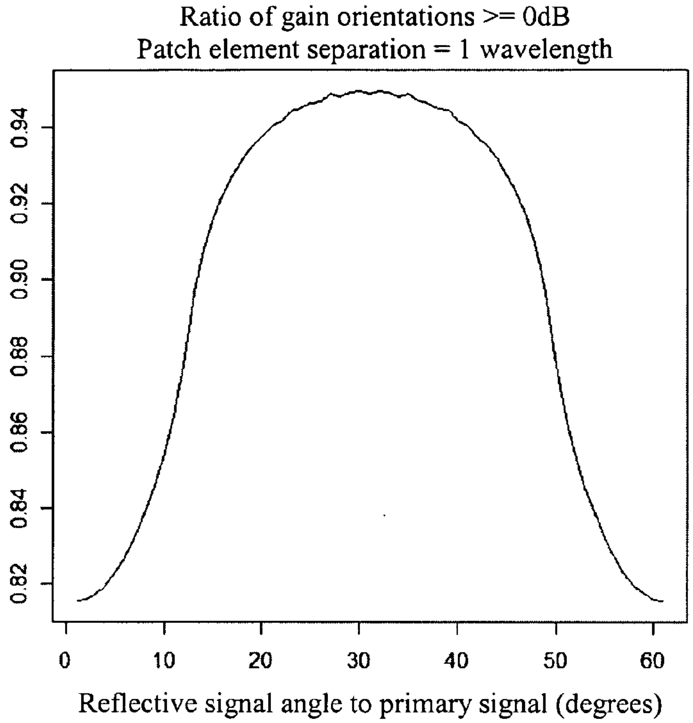
FIG. 16A shows the gain ratio of FIG. 14A, using a separation of 1 wavelength.
Figure 16B:
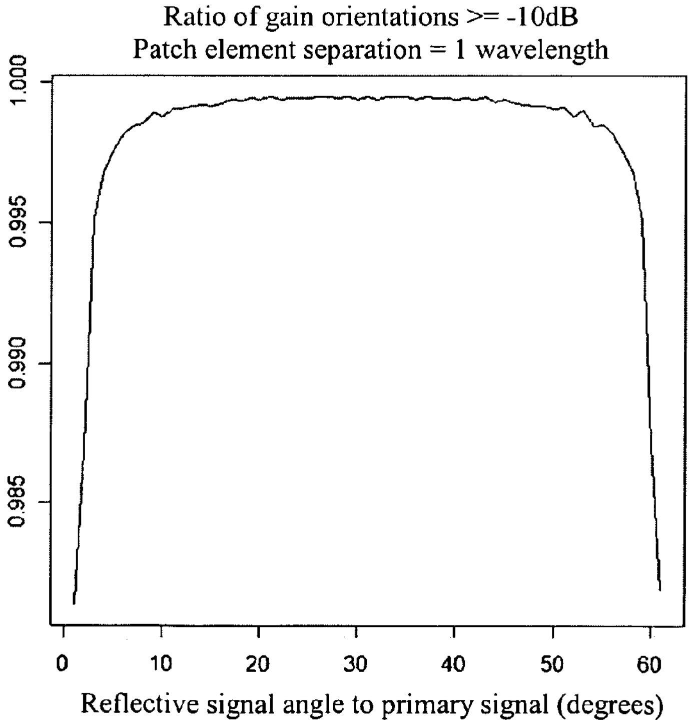
FIG. 16B shows the gain ratio of FIG. 16A with a –10 dB allowance.
Figure 17A:
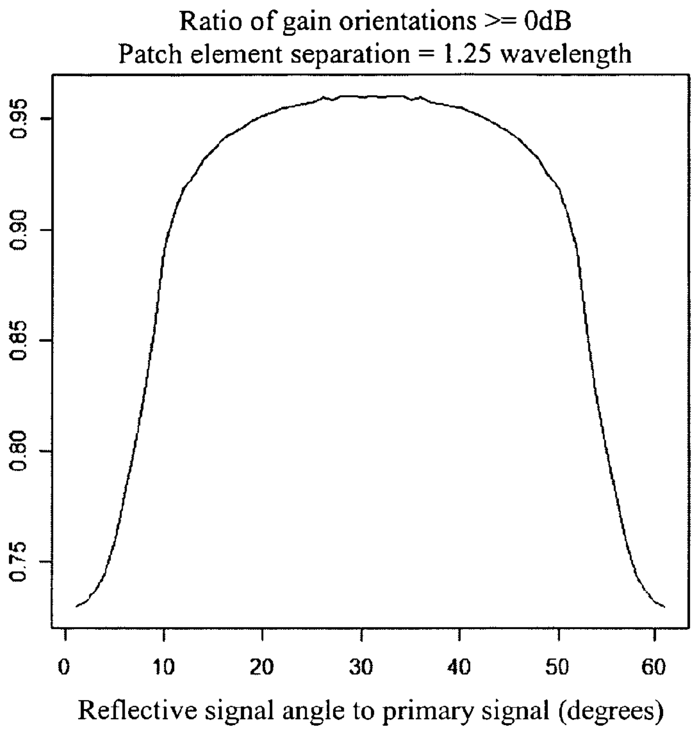
FIG. 17A shows the gain ratio of FIG. 14A, using a separation of 1.25 wavelength.
Figure 17B:
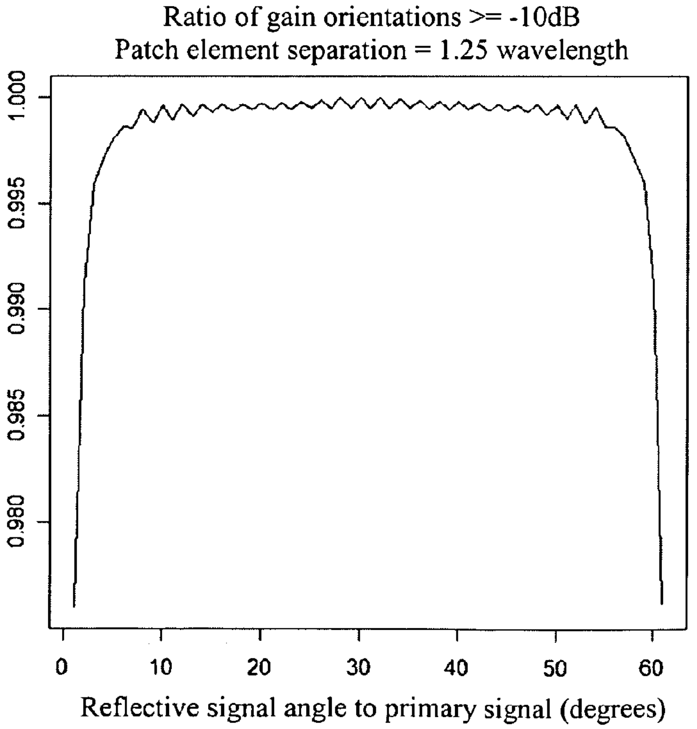
FIG. 17B shows the gain ratio of FIG. 17A with a –10 dB allowance.
Figure 18A:
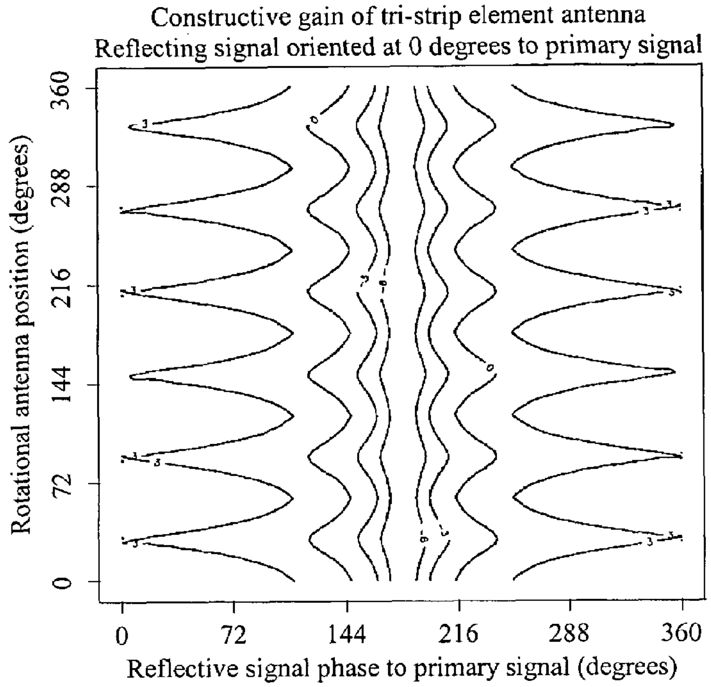
FIG. 18A shows a contour representation of a constructive gain pattern of a simulated tri-microstrip element antenna array having a separation of ½ wavelength with a secondary wave oriented at a 0 degree angle to a primary wave.
Figure 18B:
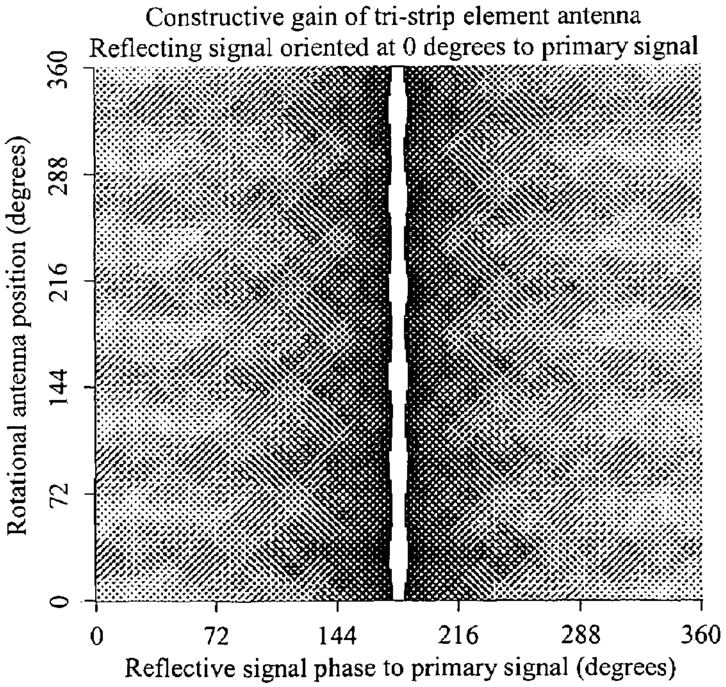
FIG. 18B shows a grayscale representation of the constructive gain pattern of FIG. 18A.
Figure 18C:
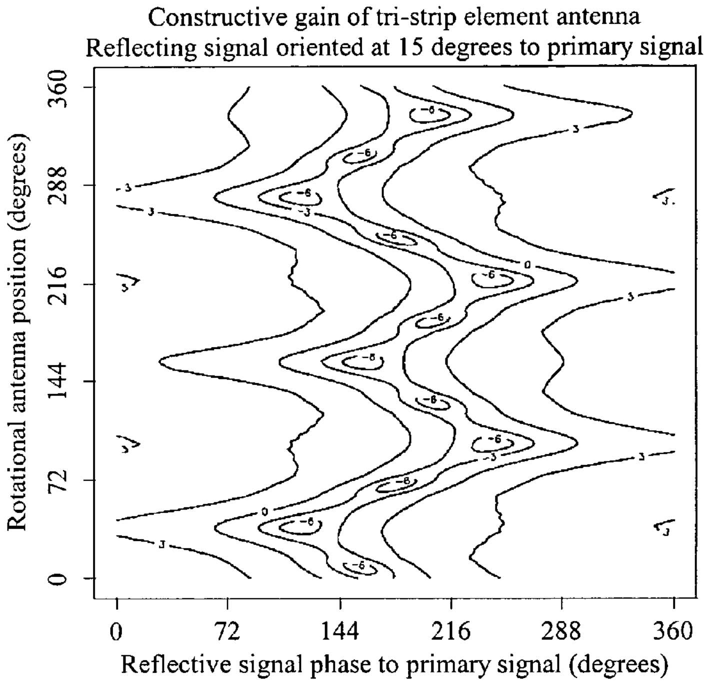
FIG. 18C shows a contour representation of the constructive gain pattern of that array with a secondary wave oriented at a 15 degree angle.
Figure 18D:
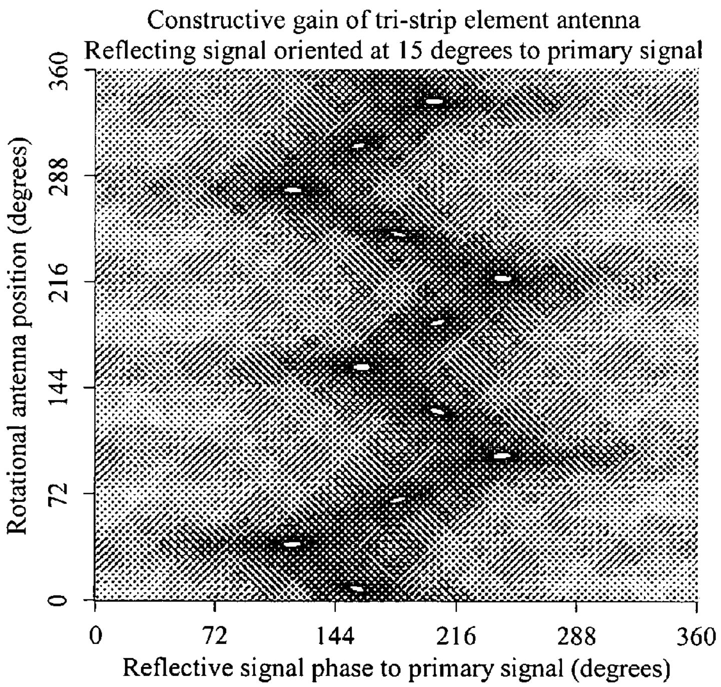
FIG. 18D shows a grayscale representation of the constructive gain pattern of FIG. 18C.
Figure 18E:
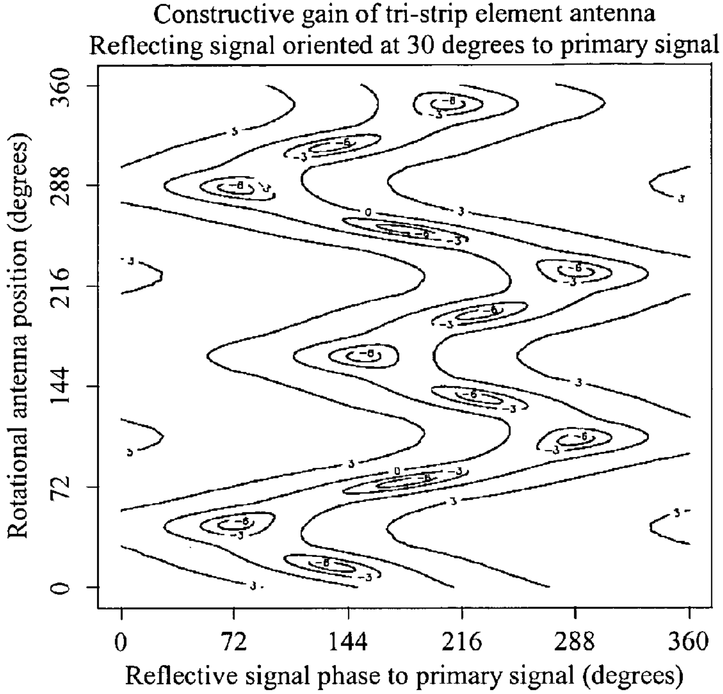
FIG. 18E shows a contour representation of the constructive gain pattern of that array with a secondary wave oriented at a 30 degree angle.
Figure 18F:
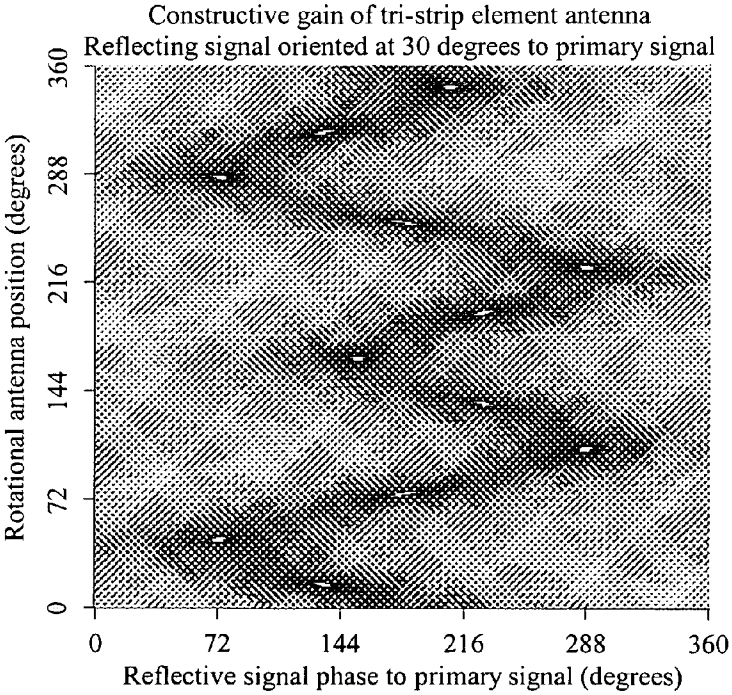
FIG. 18F shows a grayscale representation of the constructive gain pattern of FIG. 18E.
Figure 18G:
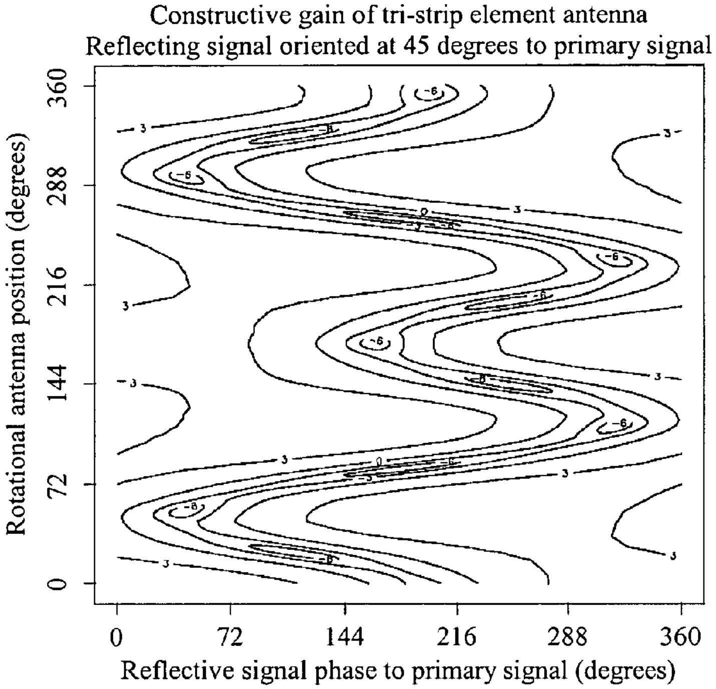
FIG. 18G shows a contour representation of the constructive gain pattern of that array with a secondary wave oriented at a 45 degree angle.
Figure 18H:
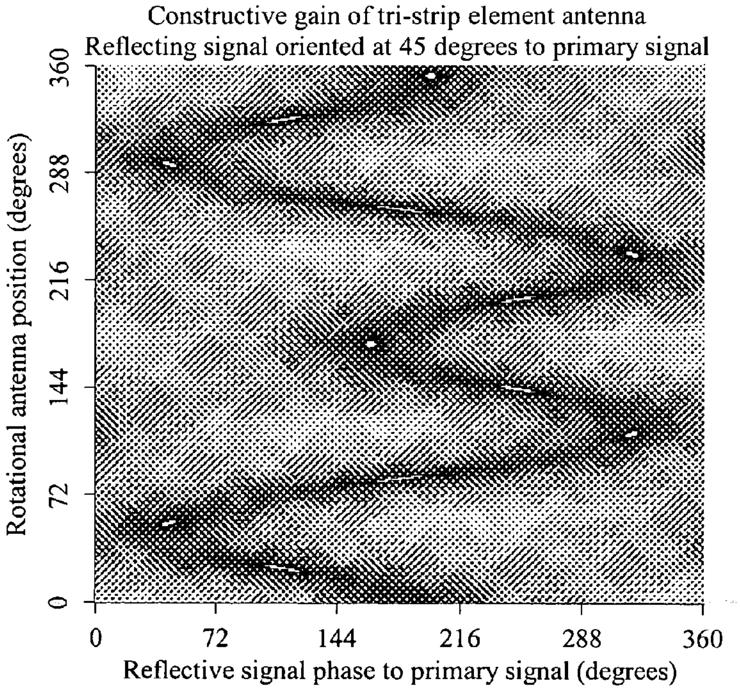
FIG. 18H shows a grayscale representation of the constructive gain pattern of FIG. 18G.
Figure 18I:
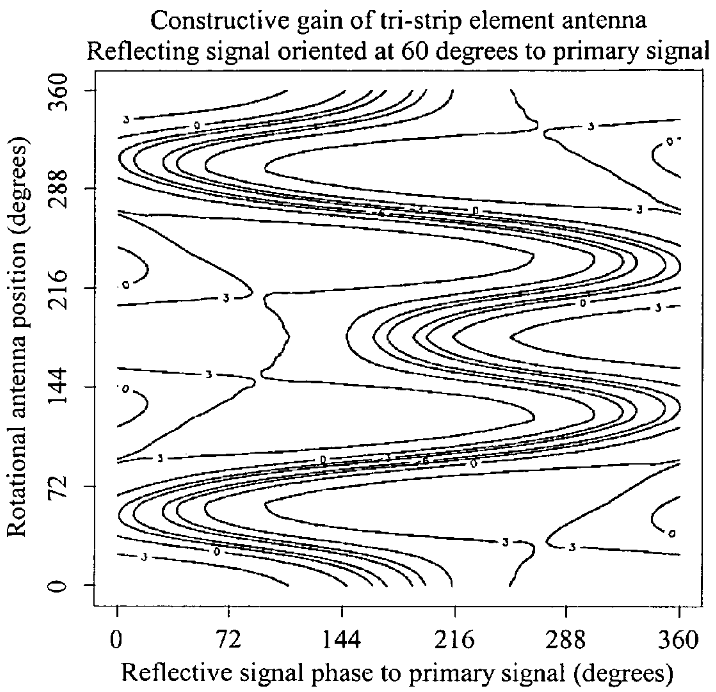
FIG. 18I shows a contour representation of the constructive gain pattern of that array with a secondary wave oriented at a 60 degree angle.
Figure 18J:
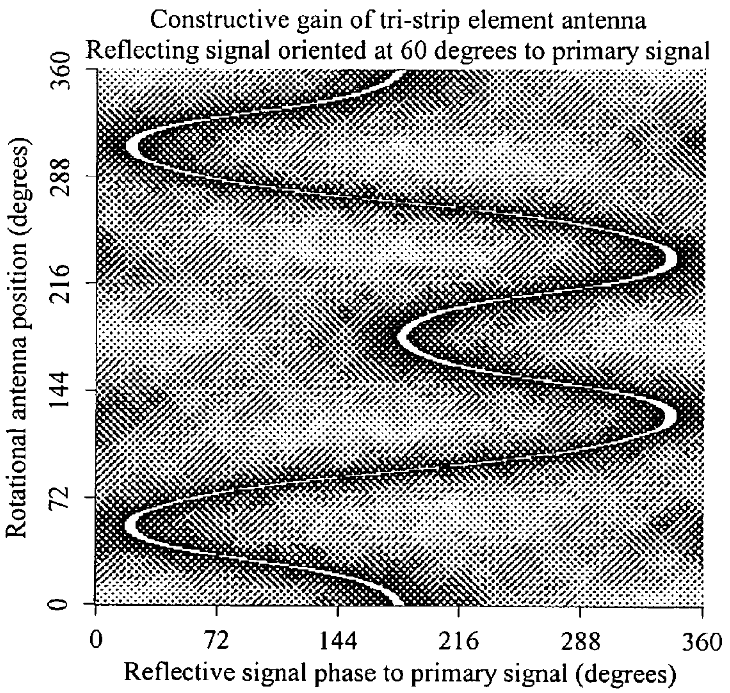
FIG. 18J shows a grayscale representation of the constructive gain pattern of FIG. 18I.

Simulations were also conducted on the monopole-element model with separations at ¾ wavelength (FIGS. 15A and 15B,) 1 wavelength (FIGS. 16A and 16B,) and 1.25 wavelength (FIGS. 17A and 17B.) The 0 dB probability seems to vary between better and worse, with a maximum occurring about 1 wavelength of separation. However as separation approaches and exceeds ¾ wavelength the −10 dB curve flattens at the top, and much more of the curve hovers near maximal probability. For example, a tri-monopole antenna with a 1.0 wavelength separation appears to have an average probability of about 99.5 percent of not being in a null, or about six times better than the monopole. Other simulations may be run by setting the appropriate variables in the attached simulation program, by which appropriate separation values can be selected.

Again, that simulation was for an antenna array composed of three monopole or substantially non-directional elements, at least as to the array element plane. That type of element is characteristic of patch antenna elements, for example the antenna depicted in FIG. 10. The simulation program can also predict the behavior of arrays with stripline, microstrip or directional elements, for example the antenna of FIG. 8, by setting the 'STRIPFACTOR' value at or close to 1.0.

FIGS. 18A-J depict antenna array gain with a separation of ½ wavelength and microstrip antenna elements (i.e. STRIPFACTOR=1.0.) The program considers the polarization as discussed and shown for FIGS. 12A and 12B, and as exemplified in the array depicted in FIG. 8. First looking at FIGS. 18A and 18B, the null near 180 degrees phase appears narrower at a 0 degree angle between secondary and primary waves, as compared to the monopole-element antenna of FIGS. 13A-J. Looking at FIGS. 18C through 18H and intermediate angles of primary to secondary wave separation, the areas of null appear to be much smaller than the monopole-element antenna. Finally looking at FIGS. 18I and 18J, the area of null is noticably smaller than that shown in FIGS. 13I and 13J.

Figure 19A:
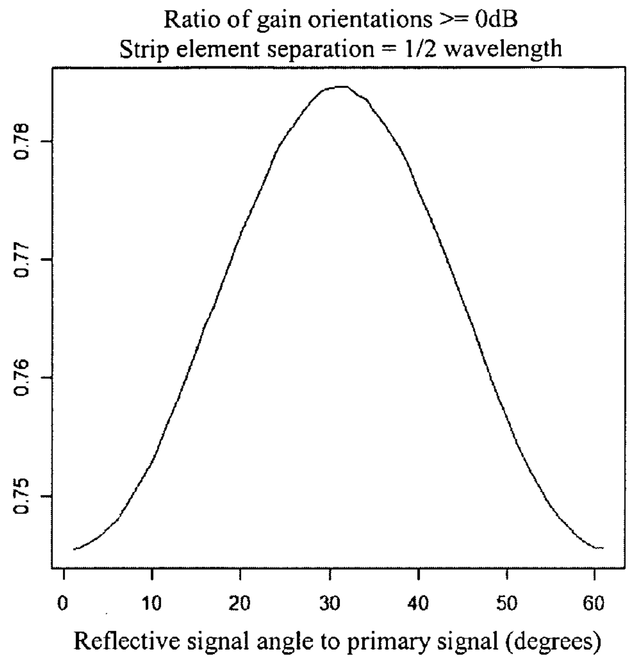
FIG. 19A shows the ratio of constructive to available positions/orientations of a simulated strip element antenna array having a element separation of ½ wavelength over angles between a primary and a secondary wave.

Turning now to FIG. 19A, the constructive gain (gain >=1.0) of the simulated tri-microstrip antenna is shown. In all angles, the probability of having increased gain is at least 74 percent, as opposed to 70 percent for the tri-monopole model and 67 percent of the monopole antenna. Thus incorporating microstrip antennas offers noticeable improvement over average gain, at least in the horizontal plane utilizing ½ wavelength element separation.

Figure 19B:
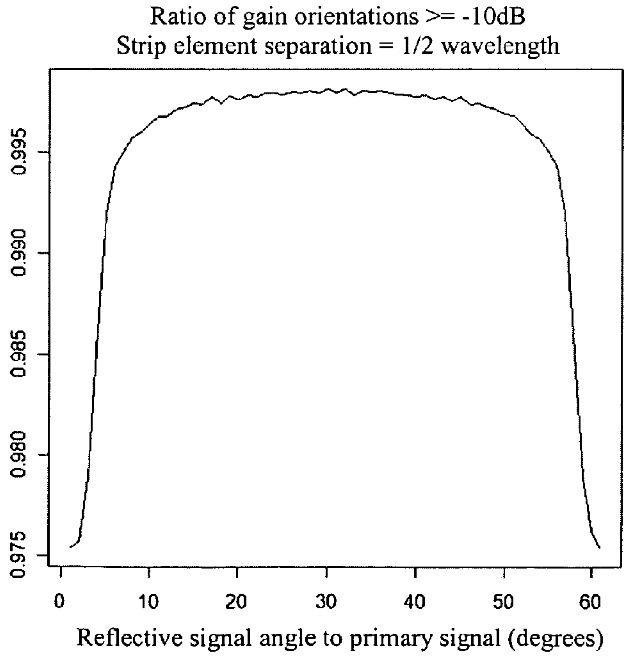
FIG. 19B shows the gain ratio of FIG. 19A with a −10 dB allowance.

Looking to FIG. 19B, the anti-null characteristic is improved over the monopole and tri-monopole antenna models, appearing to average well above 99.0 percent. The curve of FIG. 19B shows a similar improvement to that of the monopole −10 dB gain curves for ¾ to 1.25 wavelength separations shown in FIGS. 15B, 16B and 17B. Even so, the combination of improved 0 dB and −10 dB performance to this degree was not seen in the monopole-element simulations for any separation.

Figure 20A:
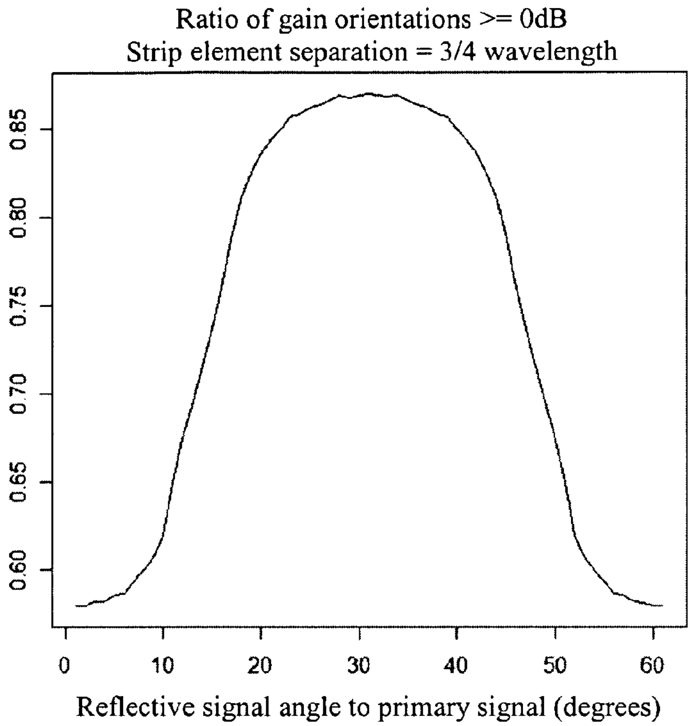
FIG. 20A shows the gain ratio of FIG. 19A, using a separation of ¾ wavelength.
Figure 20B:
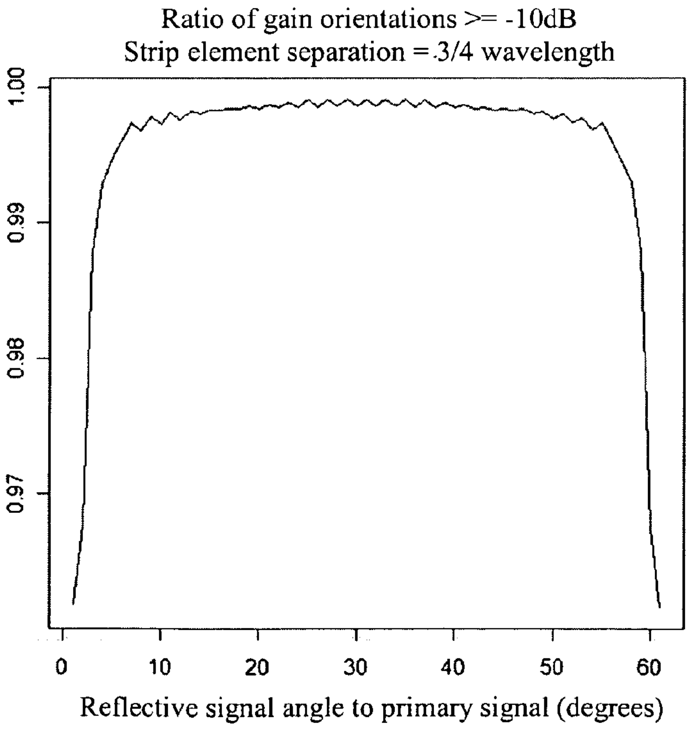
FIG. 20B shows the gain ratio of FIG. 20A with a −10 dB allowance.
Figure 21A:
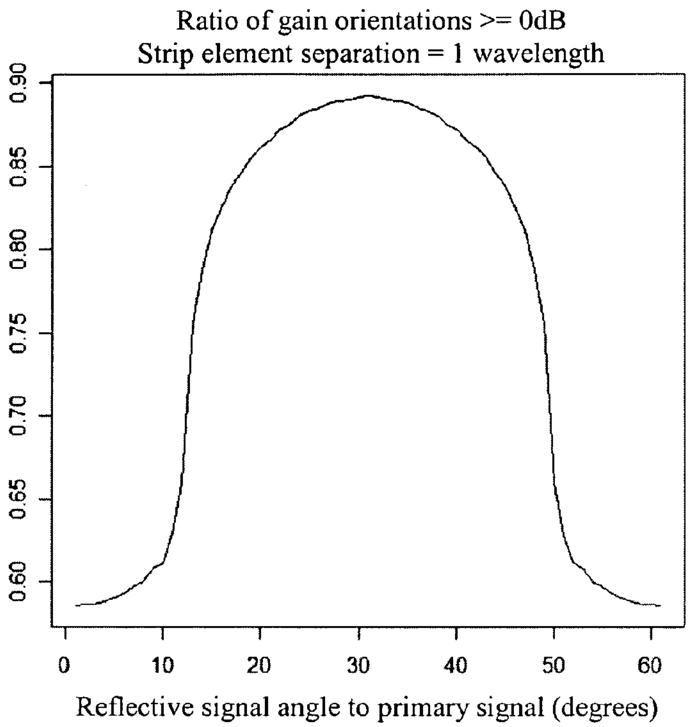
FIG. 21 A shows the gain ratio of FIG. 19A, using a separation of 1 wavelength.
FIG. 21B shows the gain ratio of FIG. 21 A with a −10 dB allowance.
Figure 21B:
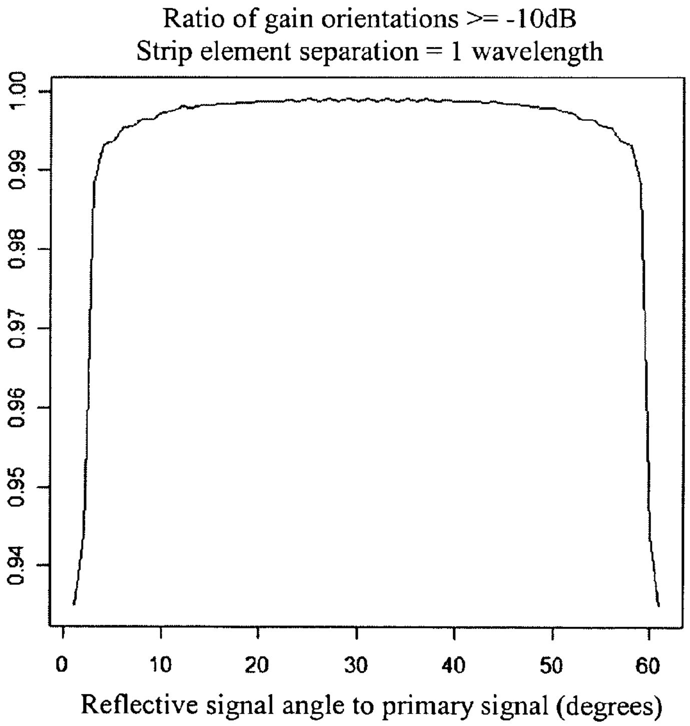
Figure 22A:
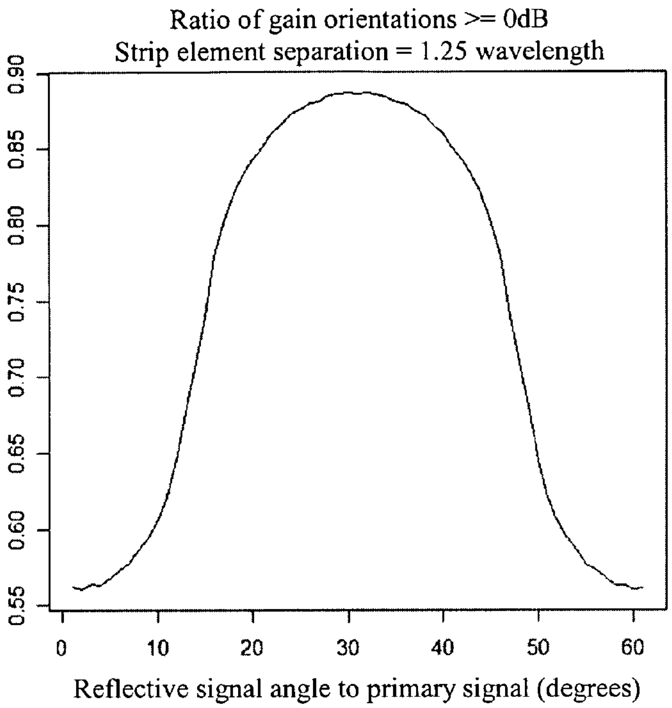
FIG. 22A shows the gain ratio of FIG. 19A, using a separation of 1.25 wavelength.
Figure 22B:
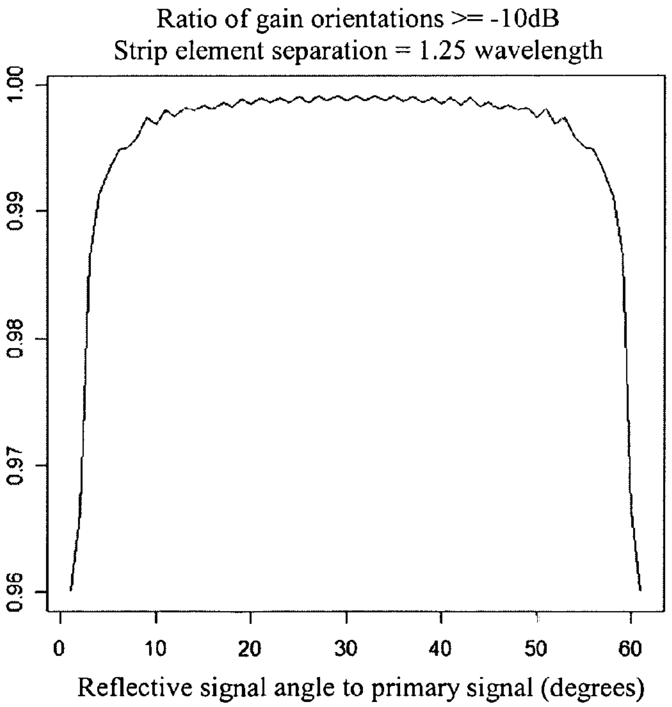
FIG. 22B shows the gain ratio of FIG. 22A with a −10 dB allowance.

Now turning to FIG. 20A, the ratio of 0 dB gain orientations of the strip-element array is considered at a separation of ¾ wavelength. Around 30 degree angle separation between the primary and secondary waves, enhanced performance is noticeable. However, near multiples of 60 degree separation angles the performance drops to under 60 percent, which is less than the 66.8 percent seen for the monopole. Referring now to FIG. 20B, the −10 dB performance is comparable to the ½ wavelength separation configuration, but again shows some weakness near multiples of 60 degree separation angles. Continuing to FIGS. 21A, 21B, 22A and 22B, the performance of an element separation of 1 or 1.25 wavelengths offers no noticeable improvement over the average performance at ½ wavelength, although these configurations show improvement near a 30 degree separation and may perform acceptably under some circumstances.

In summary, the microstrip antenna array design at one-half wavelength separation would appear from the simulation data provided above and in the figures to provide a maximally compact antenna while providing anti-reflective interference properties. However, it may be that the vertical gain of a microstrip antenna might be unacceptable in some applications, for which a monopole or patch antenna array design might be more appropriate. It should be kept in mind, however, that the anti-reflective interference properties of these antennas are mainly in the (horizontal) plane of the array, and thus that performance property may be diminished if a second wireless device falls substantially out of that plane.

Again, the three dimensional, or spherical gain of an antenna array may lack good performance in a direction perpendicular to the plane of the antenna elements, or Z direction. Referring back to FIG. 4, a device 400 that is moved vertically a substantial distance will cause path 410 to be out of line with the plane of antenna 404. The same is true of device 400 were to be tipped, or rotated. The reader will recall from FIG. 9B that the gain in the Z direction of the antenna array may suffer, particularly where microstrip antennas are used. Antenna elements configured as patches may perform better in the Z direction.

Figure 23:
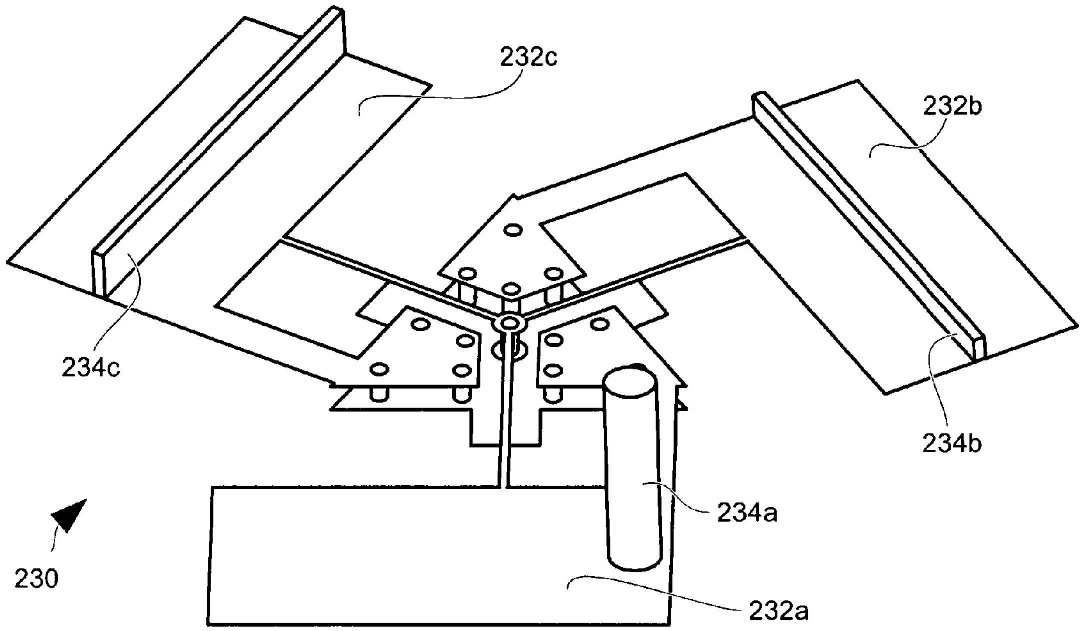
FIG. 23 depicts three kinds of extra-planar extensions incorporated to an array as shown in FIG. 10.

As a further improvement to Z direction gain, the antenna elements may be fashioned to have a portion that extends out of the plane of the array, making the antenna elements three-dimensional. Referring now to FIG. 23, an antenna array configuration 230 is shown similar to those of FIGS. 8 and 10, but having three kinds of those three-dimensional portions. Array 230 in this example includes three patch elements 232*a,* 232*b* and 232*c*. Although elements 232*a-c* are formed as a layer, the thickness of that layer is not substantially three-dimensional to improve the Z-direction gain.

In FIG. 23, a first exemplary three-dimensional portion 234*a* extends vertically from the plane of element 232*a*. Exemplary portion 234*a* is a substantial cylinder or shaft rising from the element planar surface and electrically connected thereto. The current travelling through extension 234*a* is substantially in the vertical direction, generally alternating with the voltage observed at the point of electrical attachment to element 232*a*. In simulation, this configuration demonstrates some improvement to the Z-direction gain, although at the expense of the uniformity of the horizontal gain pattern.

A second exemplary extension 234*b* forms a blade that is oriented substanially in the direction of current travel in element 232*b*. This exemplary extension is fashioned with a small height, smaller than the thickness of an applied radome material so as to encapsulate the antenna array and the extensions below the radome surface. In the exemplary array shown, the design frequency is 5.8 GHz, and the blade extension is 4 millimeters in height. Simulation of this design shows improvement to the Z-direction gain without a loss of uniformity in the horizontal gain.

A third exemplary extension 234*c* is formed as extension 234*b*, but with a greater height of 8 millimeters. Simulation shows this design to have improved Z-direction gain, again without a loss of horizontal gain uniformity. Other three-dimensional element extensions might be fashioned with other shapes, directions or attachments improving the Z-direction gain. Now the reader should recognize that normally one would select one type of extension for all of the elements used in a symmetrical array to maintain either horizontal or spherical gain uniformity, and that FIG. 23 shows a variant mainly useful for this discussion.

Extensions might be fashioned in many ways. If an array is fashioned on a copper-clad printed circuit board, the extensions might be attached using ordinary soldering techniques. A cylindrical or shaft extension as with 234*a* might be made from a length of wire. A blade might also be fashioned from a length of wire, with either rectangular, circular or other cross-section. A blade might also be cut using a stamping process from a sheet of metal. Alternatively, an array and extensions might be fashioned from conductive plastic or rubber, or made using printing techniques using conductive paints, materials and adhesives. It may be desired to fashion extensions from substantially identical materials as those used for the array elements, so as to preserve a common wave propagation speed throughout the array.

Figure 24:
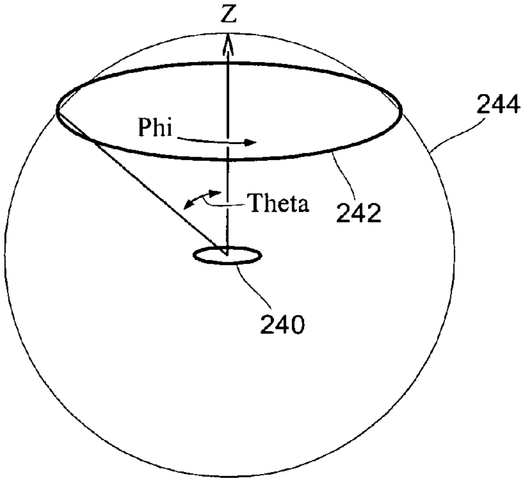
FIG. 24 shows the axial scheme an evaluation of the vertical gain of an antenna array having a planar orientation.

Shown in FIG. 24 is a scheme of evaluation of the vertical gain of an antenna array 240. Conceptually, the gain in any direction from array 240 may be measured at any point on a sphere 244, and as array 240 is positioned at the center of the sphere each point will be equadistant from every other point of the sphere providing a base signal level. In this scheme a direction Z is chosen, which may be chosen to be in the vertical direction of array 240. An angle from Z, called theta in this scheme, defines a small circle 242 on the surface of sphere 244. The gain may be measured at a number of rotational angles phi around circle 242.

Figure 25:
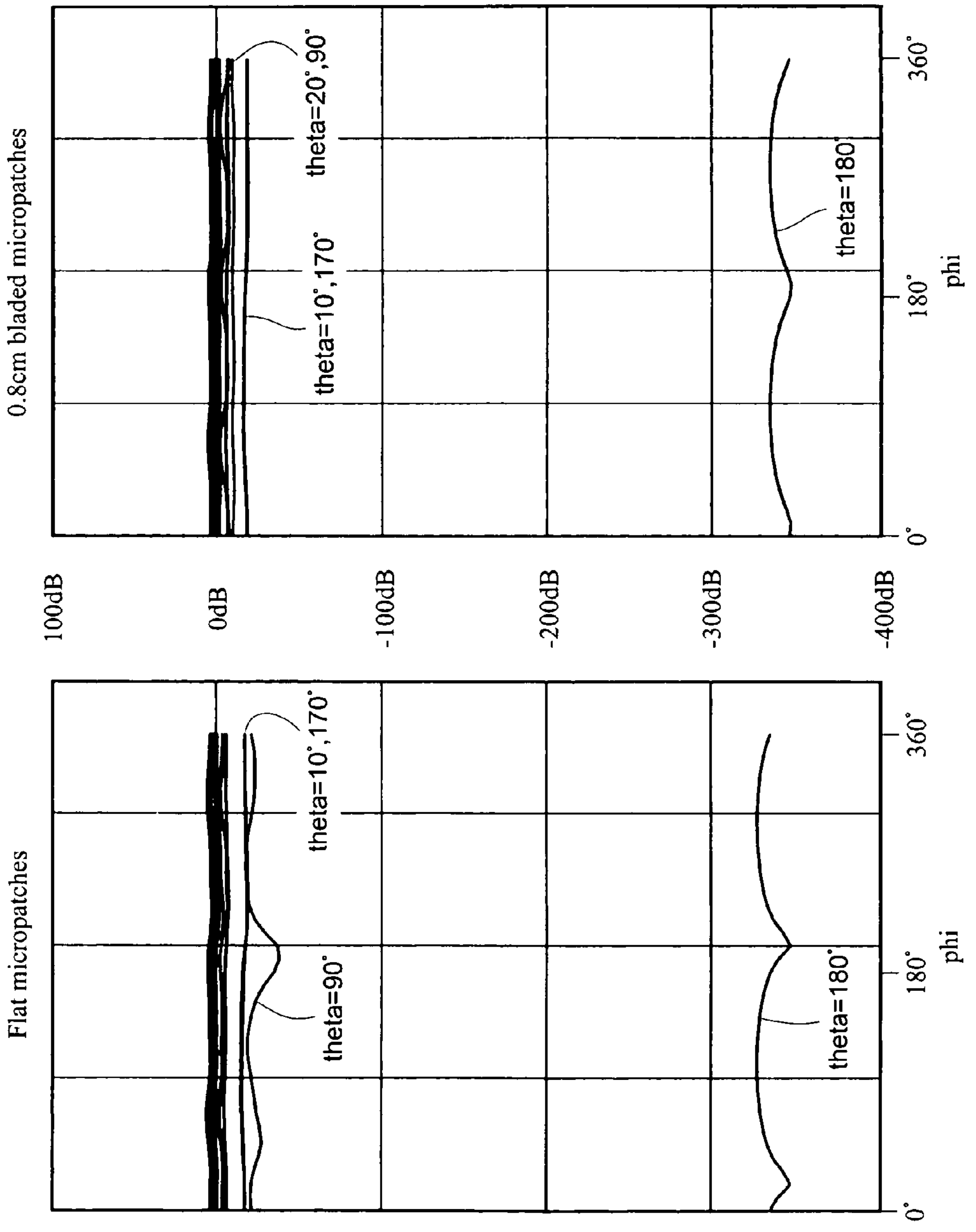
FIG. 25 shows a comparison of the electric field gain between an array as shown in FIG. 23 with and without bladed extensions according to the scheme of FIG. 24.

Referring now to FIG. 25, the electric field gain in the Z direction of two antenna arrays similar to that shown in FIG. 23 is depicted, comparing an array without extensions ("flat micropatches") to an array with 8 millimeter bladed extensions. The reader will observe that the gain directly at 180 degrees is not improved with the addition of the blades. The gain at 10 and 170 degrees is improved, while the gain between 20 and 160 degrees (the indistinguishable group of lines at the top) remains largely stable. The gain at 90 degrees with flat micropatches is reduced, because the emmissions of the array at 90 degrees are not sufficiently polarized in the Z direction.

Now although the antenna concepts and designs described above may find particular uses in wireless teleconferencing products, these concepts and designs might also be incorporated to other electronic wireless products having a normal orientation permitting substantial alignment of the antenna array with a second wireless device, so as to bring any reflective immunity properties to bear upon the communication channel in a primary direction while permitting rotation of the product in the plane of the antenna array. And while various anti-reflective interference antenna arrays and products have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

APPENDIX I

```
NPOINTS=20 #Number of points to compute on a wave; increase for more precision
SEPARATION=1.0 #Separation of elements in ½ wavelengths
STRIPFACTOR=0.0 #Use 1.0 for strip/line, 0.0 for monopole/patch or something in-between
PI <- 3.141592654
DEG <- 0:NPOINTS*2*PI/NPOINTS
#this is the gain without interference (in the horizontal plane)
gain <- array(0,dim=c(360))
for (i in (0:359)) {
    A <- sin(DEG)*((1.0-STRIPFACTOR) + (STRIPFACTOR*abs(cos((150-i)*2*PI/360))))
    B <- sin(DEG + (PI*SEPARATION)*cos((i+90)*2*PI/360))*((1.0-STRIPFACTOR) +
(STRIPFACTOR*abs(cos((30-i)*2*PI/360))))
    C <- sin(DEG + (PI*SEPARATION)*cos((i+150)*2*PI/360))*((1.0-STRIPFACTOR) +
(STRIPFACTOR*abs(cos((90-i)*2*PI/360))))
    w <- A+B+C
```

APPENDIX I-continued

```
    gain[i+1]=max(max(w),abs(min(w)))
# plot(w,type="1",sub=i)
}
plot(gain,type="1")
#this is the gain with interference
gain <- array(0,dim=c(360))
egain <- array(0,dim=c(360,360))
aboveunity <- array(0,dim=c(61))
aboveminusten <- array(0,dim=c(61))
bettert=0;
worset=0;
for (d in 0:60) { #direction of reflective wave
    better=0;
    worse=0;
    bettermt=0;
    worsemt=0;
    for (i in (0:359)) { #rotate the antenna in the horizontal plane
        A <- sin(DEG)*((1.0-STRIPFACTOR) + (STRIPFACTOR*abs(cos((150-i)*2*PI/360))))
        B <- sin(DEG + (PI*SEPARATION)*cos((i+90)*2*PI/360))*((1.0-STRIPFACTOR) +
(STRIPFACTOR*abs(cos((30-i)*2*PI/360))))
        C <- sin(DEG + (PI*SEPARATION)*cos((i+150)*2*PI/360))*((1.0-STRIPFACTOR) +
(STRIPFACTOR*abs(cos((90-i)*2*PI/360))))
        for (p in (0:359)) { #phase of reflective wave
            IA <- sin(DEG + (p*2*PI/360))*((1.0-STRIPFACTOR) + (STRIPFACTOR*abs(cos((150-
i+d)*2*PI/360))))
            IB <- sin(DEG + SEPARATION*PI*cos(((i-d)+90)*2*PI/360) + (p*2*PI/360))*((1.0-
STRIPFACTOR) + (STRIPFACTOR*abs(cos((30-i+d)*2*PI/360))))
            IC <- sin(DEG + SEPARATION*PI*cos(((i-d)+150)*2*PI/360) + (p*2*PI/360))*((1.0-
STRIPFACTOR) + (STRIPFACTOR*abs(cos((90-i+d)*2*PI/360))))
            w <- A+B+C+IA+IB+IC
#   plot(w,type="1",sub=i)
            thisw=max(w)
            gain[p+1] <- thisw
            if (thisw >= 0.10) bettermt <- bettermt + 1 else worsemt <- worsemt + 1
            if (thisw >= 1.0) better <- better + 1 else worse <- worse + 1
            if (thisw >= 1.0) bettert <- bettert + 1 else worset <- worset + 1
            if (thisw < 0.001) thisw=0.001
            egain[p+1,i+1] <- log10(thisw)*10
        }
# plot(gain-1,type="1",sub=i,log="y",ylim=c(0.01,2.1))
# plot(gain,type="1",sub=i,ylim=c(0,6))
    }
    #contour(egain,xlab="p",ylab="i",levels=c(0.0,1.0,2.0,3.0,4.0,5.0))
    #contour(egain,xlab="p",ylab="i",levels=c(-6.0,-3.0,0.0,3.0,6.0))
    image(egain,zlim=c(-10,8),col=gray((0:32)/32))
    print ("d=")
    print (d)
    print ("ratio=")
    print (better/(better+worse))
    aboveunity[d+1] <- (better/(better+worse))
    aboveminusten[d+1] <- (bettermt/(bettermt+worsemt))
}
plot(aboveunity,type="1")
```

What is claimed:

1. A wireless communications device having improved reflective interference immunity, comprising:

a housing defining a vertical axis, said housing further including a mounting for orienting said vertical axis substantially vertically;

electronics adapted to provide radio communications between said device and a second wireless device;

a circuit layer aligned substantially in a horizontal plane with respect to said vertical axis;

a set of antenna elements incorporated in said layer, said elements arranged in a radially symmetrical configuration;

transmission feed lines electrically connected to said antenna elements;

a combiner electrically connected to said antenna elements through said transmission feed lines, said combiner further electrically connected to said electronics whereby said electronics may either transmit or receive radio communications with the second wireless device through said set of antenna elements.

2. A wireless communications device according to claim 1, wherein said device has the property that nulls can be shifted in phase by rotating said device in the horizontal plane.

3. A wireless communications device according to claim 1, wherein the arrangement of said set of antenna elements provides a greater ratio of usable device positions to the total device positions available than provided by a theoretical monopole antenna, whereby the rotation of the device in the horizontal plane, the phase of a reflected wave with respect to a primary wave and the angle of the reflected wave with respect to the primary wave in the horizontal plane defines the available device positions.

4. A wireless communications device according to claim 1, wherein the arrangement said set of antenna elements provides a decreased ratio of unusable device positions to the total device positions available than provided by a theoretical monopole antenna, whereby the rotation of the device in the horizontal plane, the phase of a reflected wave with respect to a primary wave and the angle of the reflected wave with respect to the primary wave in the horizontal plane defines the available device positions.

5. A wireless communications device according to claim 1, wherein said device is defined to communicate at a particular frequency, and farther wherein said antenna elements are substantially separated by one-half wavelength apart.

6. A wireless communications device according to claim 1, wherein said wireless communications device achieves immunity from reflective interfering waves without switching said antenna elements.

7. A wireless communications device according to claim 1, wherein each of said antenna elements is a micro-strip oriented perpendicular to a line passing through the element and the center of said set of antenna elements.

8. A wireless communications device according to claim 1, wherein each of said antenna elements is a patch antenna element.

9. A wireless communications device according to claim 1, wherein each of said antenna elements is a substantial monopole with respect to the horizontal plane.

10. A wireless communications device according to claim 1, wherein said transmission feed lines are impedance balanced.

11. A wireless communications device according to claim 1, wherein said transmission feed lines have equal propagation delay.

12. A tabletop wireless communications device having improved reflective interference immunity, comprising:

- a housing configured to rest on a tabletop in a resting position, said resting position further defining a vertical axis and a horizontal plane;
- electronics adapted to provide radio communications with said device and a second wireless device;
- a circuit layer aligned substantially in the horizontal plane;
- a set of antenna elements incorporated in said layer, said elements arranged in a radially symmetrical configuration;
- transmission feed lines electrically connected to said antenna elements, said transmission feed lines being further balanced with respect to impedance and propagation delay;
- a combiner electrically connected to said antenna elements through said transmission feed lines, said combiner further electrically connected to said electronics whereby said electronics may either transmit or receive radio communications with the second wireless device through said set of antenna elements;
- wherein said wireless communications device achieves immunity from reflective interfering waves without switching said antenna elements.

13. A wireless communications device according to claim 12, wherein said device has the property that nulls can be shifted in phase by rotating said device in the horizontal plane.

14. A wireless communications device according to claim 12, wherein the arrangement of said set of antenna elements provides a greater ratio of usable device positions to the total device positions available than provided by a theoretical monopole antenna, whereby the rotation of the device in the horizontal plane, the phase of a reflected wave with respect to a primary wave and the angle of the reflected wave with respect to the primary wave in the horizontal plane defines the available device positions.

15. A wireless communications device according to claim 12, wherein the arrangement said set of antenna elements provides a decreased ratio of unusable device positions to the total device positions available than provided by a theoretical monopole antenna, whereby the rotation of the device in the horizontal plane, the phase of a reflected wave with respect to a primary wave and the angle of the reflected wave with respect to the primary wave in the horizontal plane defines the available device positions.

16. A wireless communications device according to claim 12, wherein said device is defined to communicate at a particular frequency, and further wherein said antenna elements are substantially separated by one-half wavelength apart.

17. A wireless communications device according to claim 12, wherein each of said antenna elements is a micro-strip oriented perpendicular to a line passing through the element and the center of said set of antenna elements.

18. A tabletop wireless conferencing device having improved reflective interference immunity, comprising:

- a housing configured to rest on a tabletop in a resting position, said resting position further defining a vertical axis and a horizontal plane;
- radio electronics adapted to provide radio communications with said device and a second wireless device;
- a printed circuit board incorporating a circuit layer aligned substantially in the horizontal plane;
- a set of three micro-strip antenna elements incorporated in said layer, said elements arranged in an equilateral triangle configuration, each of said elements oriented perpendicular to a line passing through the element and the center of said set of antenna elements;
- transmission feed lines electrically connected to said antenna elements;
- a combiner electrically connected to said antenna elements through said transmission feed lines, said combiner further electrically connected to said electronics whereby said electronics may either transmit or receive radio communications with the second wireless device through said set of antenna elements;
- speaker electronics adapted to emit an audible representation of a remote audio input, the audio input being received as a signal at said radio electronics;
- audio input electronics adapted to sense sound at said device, said auto input electronics adapted to convert the sensed sound to an audio signal suitable for transmission by said radio electronics.

* * * * *